(12) United States Patent
Gang et al.

(10) Patent No.: US 11,554,360 B2
(45) Date of Patent: Jan. 17, 2023

(54) METHOD OF MANUFACTURING AN ADSORBENT AND RESULTING COMPOSITION OF MATTER

(71) Applicant: University of Louisiana at Lafayette, Lafayette, LA (US)

(72) Inventors: Daniel Dianchen Gang, Lafayette, LA (US); Qiyu Lian, Lafayette, LA (US); Mark Zappi, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 343 days.

(21) Appl. No.: 16/526,113

(22) Filed: Jul. 30, 2019

(65) Prior Publication Data
US 2020/0047154 A1 Feb. 13, 2020

Related U.S. Application Data

(60) Provisional application No. 62/715,457, filed on Aug. 7, 2018.

(51) Int. Cl.
| | |
|---|---|
| *B01J 20/20* | (2006.01) |
| *B01D 53/02* | (2006.01) |
| *B01J 20/30* | (2006.01) |
| *B01J 20/02* | (2006.01) |
| *B01J 20/28* | (2006.01) |
| *C02F 1/28* | (2006.01) |
| *C01B 32/312* | (2017.01) |
| *C01B 32/354* | (2017.01) |
| *C02F 101/20* | (2006.01) |

(52) U.S. Cl.
CPC .............. *B01J 20/20* (2013.01); *B01D 53/02* (2013.01); *B01J 20/0259* (2013.01); *B01J 20/28064* (2013.01); *B01J 20/28066* (2013.01); *B01J 20/28083* (2013.01); *B01J 20/3057* (2013.01); *B01J 20/3071* (2013.01); *B01J 20/3078* (2013.01); *C01B 32/312* (2017.08); *C01B 32/354* (2017.08); *C02F 1/28* (2013.01); *B01D 2253/102* (2013.01); *B01D 2253/25* (2013.01); *C02F 1/281* (2013.01); *C02F 1/283* (2013.01); *C02F 2101/20* (2013.01)

(58) Field of Classification Search
CPC ............................... C01B 32/354; B01J 20/20
See application file for complete search history.

(56) References Cited

U.S. PATENT DOCUMENTS 11,077,421 B2 * 8/2021 Srinivas ............. B01J 20/28083

OTHER PUBLICATIONS

Ren, H, Preparation and post-treatments of ordered mesoporous carbons (OMC) for resorcinol removal; Int. J. Environ. Sci. Technol. (2016) 13:1505-1514.

* cited by examiner

*Primary Examiner* — Stuart L Hendrickson
(74) *Attorney, Agent, or Firm* — Kean Miller LLP; Russel O. Primeaux; Lauren J. Rucinski

(57) ABSTRACT

The present invention covers a novel method for creating an adsorbent and the resulting novel adsorbent. The method may be used to remove pollutants/unwanted chemicals from water, air, other gases, biological fluids (such as blood, urine, lipids, protein fluids), and other fluids (such as fuel). The adsorbent may be used to remove heavy metals (for example, lead), organic pollutants, inorganic non-meal pollutants (for example, nitrates and bromates). Accordingly, the current invention has many applications including but not limited to water treatment, wastewater treatment, biomedical fluid treatments, gas cleanup, and fuel (oil, gas) cleanup.

10 Claims, 19 Drawing Sheets

METHOD OF MANUFACTURING AN ADSORBENT AND RESULTING COMPOSITION OF MATTER

CROSS REFERENCE TO RELATED APPLICATIONS

This application claims priority to U.S. Provisional Application No. 62/715,457 entitled "Method of Manufacturing an Adsorbent and Resulting Composition of Matter", filed Aug. 7, 2018.

STATEMENT REGARDING FEDERALLY SPONSORED RESEARCH OR DEVELOPMENT

Not Applicable.

Reference to a "Sequence Listing," a Table, or a Computer Program

Not Applicable.

DESCRIPTION OF THE DRAWINGS

The drawings constitute a part of this specification and include exemplary embodiments of the Method of Manufacturing an Adsorbent and Resulting Composition of Matter which may be embodied in various forms. It is to be understood that in some instances, various aspects of the invention may be shown exaggerated or enlarged to facilitate an understanding of the invention. Therefore the drawings may not be to scale.

FIG. 5($b$) is a depiction of SEM and EDS images of MOMC-NP and; FIG. 5($c$) is a depiction of SEM and EDS images of-MOMC-NP after Lead(II) Adsorption.

FIG. 6($b$) is TEM images of OMC and; FIG. 6($c$) is TEM images of MOMC-NP.

FIG. 7($b$) is the graph of the effect of pH value on initial pH value of Pb(II) solution ($C_0$=50 mg $L^{-1}$, S/V=1 g $L^{-1}$, T=25° C., Shaking time=24 h)

FIG. 12($b$) is the graph of Freundlich isotherm; FIG. 12($c$) is the graph of Dubinin-Radushkevich (D-R) isotherm; FIG. 12($d$) is the graph of Temkin Isotherm; FIG. 12($e$) is the graph of Halsey isotherm; FIG. 12($f$) is the graph of Harkins-Jura isotherm; FIG. 12($g$) is the graph of Evolich isotherm; FIG. 12($h$) is the graph of Redlich-Peterson isotherm; and FIG. 12($i$) is the graph of Sips isotherm.

BACKGROUND

Figure 1:
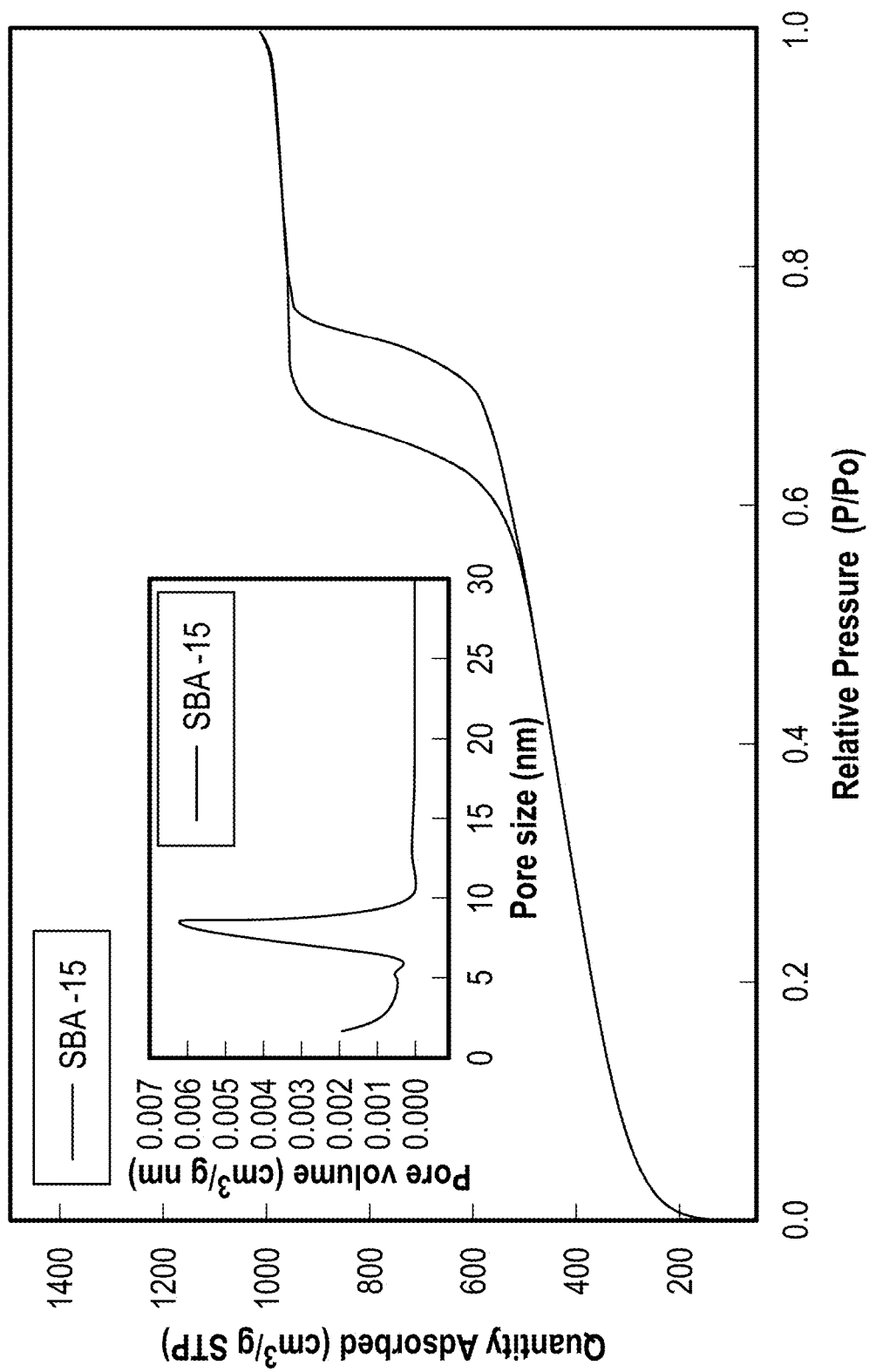
FIG. 1 is a graph of Nitrogen adsorption-desorption isotherm and pore size distribution of SBA-15.

With rapid urbanization and industrialization coupled with increased population growth, the demand for potable water is ever increasing. Heavy metal contamination attributable to industrial and domestic practices contaminates ground and surface water and has been identified as a major environmental threat. Lead is a heavy metal often discharged into waterbodies from various industries such as metal plating, painting, mining operations, and battery manufacturing. The solders of distribution systems are the primary source of dissolved lead in drinking water in US. Significantly, buildings from built between the 1930s and early 1980s often used copper pipes. The solders used to connect these copper pipes contain elevated levels of lead.

The non-biodegradable nature of Pb(II) causes accumulation of the metal in living organisms and can cause detrimental health effects. Long term exposure to Pb(II) beyond the acceptable limits has been identified to cause health problems such as abortion, stillbirths, sterility, mental disturbance, and liver and kidney damage. For example, the Flint water crisis began in 2014 when the drinking water source for the city of Flint in Michigan was changed to the Flint River. Due to insufficient water treatment, over 100,000 residents were potentially exposed to high levels of lead in the drinking water. The permissible amount of Pb(II) is less than 0.01 mg $L^{-1}$ in drinking water as recommended by World Health Organization (WHO). The permissible level of Pb(II) in drinking water set by United States Environmental Protection Agency (USEPA) being 0.015 mg $L^{-1}$.

Several available techniques extensively used for the treatment of Pb(II) in water include: chemical precipitation, ion-exchange, membrane separation, reverse osmosis, and adsorption. There are some disadvantages associated with these treatment methods such as treatment time requirements, sludge disposal problems, sensitive operating conditions, and the high treatment costs needed to meet the current environmental requirements. Among these technologies, adsorption techniques have gained a lot of attention due to its effectiveness in removing Pb(II) ions from effluents, coupled with its low cost and simple operations. Currently, various adsorbents have been reported for Pb(II) ion removal from aqueous solutions such as chitosan—tripolyphosphate, modified lignin, phosphorylated bacterial cellulose, carbon aerogel, carbon nanotubes, and chitosan.

Ordered Mesoporous Carbon (OMC), a new adsorbent, has gained considerable attention due to its unique features, such as a high BET surface area, large pore volume, and high mechanical strength. All of these special features make OMC a suitable adsorbent to remove pollutants. However, OMC has had limited success for metal ion removal and some organic pollutants. Therefore, chemical modifications of OMC are gaining considerable interests for improving sorption performance. In general, the OMC modified by chemical compounds have been shown to yield higher adsorption capacities and removal efficiencies for various aquatic pollutants. For example, a modified OMC with varying chemicals for mercury, orange(II), BTEX and resorcinol removal.

In one embodiment, phosphate function groups are incorporated onto the OMC surface for improving Pb(II) ion removal. The function groups on the surface of OMC have a good affinity to Pb(II) ion in aqueous solutions. It is well-known that phosphate groups have shown excellent chelating properties with Pb(II) ions in aqueous solutions. Also, there are many applications of phosphate groups for heavy metal removal from the waste stream via banding and settling. For example, phosphorylated bacterial cellulose has been used as an absorbent to remove various lanthanide ions and transition metal ions. Metal cations are typical Lewis Acids and phosphate groups with a low Acid-Base ionization equilibrium constant show a typical Lewis Base properties in a wide range of pH. According to Lewis Acid-Base theory, phosphate groups have a significant performance on connecting with metal cations through electrostatic interaction or chelation. Various phosphorylating agents have been studied on cellulosic materials for decades, such as phosphorus oxychloride ($POCl_3$), phosphorus pentoxide ($P_2O_5$), phosphoric acid ($H_3PO_4$), and diammonium hydrogen phosphate ($(NH_4)_2HPO_4$). These approaches were built on the assumptions of different forms of phosphorylation, such as phosphorylation of R—OH, phosphorylation on double bonds, and phosphorylation of amine functions.

Using nitric acid as an intermediate chemical introduces more —OH groups on the surface of OMC so that more phosphate groups can be incorporated on the surface of OMC after the phosphoric acid treatment. The presence of abundant phosphate groups on the surface of OMC is theorized to provide more active sites for the Pb(II) ion complexation, making this a better adsorbent for Pb(II) ion removal. Compared with the previous absorbents modified by phosphoric acid, OMC, with a large BET surface area and large pore size, may provide more active sites to combine with phosphate groups and the resulting bonding.

The present invention covers a novel method for creating an adsorbent and the resulting novel adsorbent. The method may be used to remove pollutants/unwanted chemicals from water, air, other gases, biological fluids (such as blood, urine, lipids, protein fluids), and other fluids (such as fuel). The adsorbent may be used to remove heavy metals (for example, lead), organic pollutants, inorganic non-meal pollutants (for example, nitrates and bromates). Accordingly, the current invention has many applications including but not limited to water treatment, wastewater treatment, biomedical fluid treatments, gas cleanup, and fuel (oil, gas) cleanup.

DETAILED DESCRIPTION

This invention describes a method for creating an adsorbent and the resulting adsorbent. The adsorbent is created by modifying Ordered Mesopours Carbon ("OMC") with phosphoric acid ($H_3PO_4$, 85%) and nitric acid (69%-71%).

SBA-15 silica template was prepared using triblock copolymer surfactant Pluronic P123 ($EO_{20}PO_{70}EO_{20}$) and tetraethyl orthosilicate (TEOS) as the silica source under acidic condition as known in the art. First, 20 g triblock copolymer surfactant P123 and 100 mL of 37% hydrochloric (HCl) solution were added to 525 mL of DI water under continuous stirring. After that, 46.5 mL of TEOS was added to the mixture under constant stirring for additional 30 mins until the surfactant was completely dissolved. Then, the white turbid mixture was treated in a constant temperature water bath (for example, Premiere HH-4) at 50° C. for 6 h, followed by aging for 24 h at 90° C. Next, the mixture was filtered and washed using 80-90° C. DI water and dried in the oven at 105° C. overnight. Finally, the SBA-15 product was calcined in the box furnace (for example, Lindberg/Blue M Moldatherm Box Furnace Thermo Scientific) at 550° C. for 8 hours. The white SBA-15 silica template product was stored in the desiccator for the preparation of OMC.

The OMC was synthesized via a hard template method using sucrose as the carbon precursor, as known in the art. Initially, 1.5 g of sucrose ($C_{12}H_{22}O_{11}$) and 0.2 mL of concentrated sulfuric acid ($H_2SO_4$) were added to 20 mL of DI water with continuous stirring to completely dissolve the sucrose. Then, 2 g of SBA-15 template was added to the mixture and stirred for 90 mins. After stirring, the mixture was heated sequentially at 100° C. for 6 hours and 160° C. for another 6 hours. Finally, the obtained composite was then carbonized at 700° C. for 6 hours under a nitrogen ($N_2$) flow of 100 mL min-1. Afterwards, the black product was washed with approximately 50 mL of hydrofluoric (HF) solution at room temperature and stirred for at least 24 hours to remove the silica template completely. After silica removal, the obtained product was filtered and washed with at least 4000 mL of DI water until the pH value of filtered water was close to 7.0.

In other embodiments, materials that perform the same function could be substituted when producing OMC. The following examples of alternate materials are non-exclusive. Examples of other copolymers that could be used include Pluronic P123, Brij® 58, Brij 76. Likewise, sources of silica could include Tetraethyl Orthosilicate (TEOS). Sources of carbon that could be substituted include acrylic acid, acrylamide, glucose, furfuryl alcohol, mixture of ethylenediamine and carbon tetrachloride. Finally, other acids, including, phosphoric acid (H3PO4), nitric acid (HNO3), hydrochloric acid (HCl) could be substituted.

In order to manufacture the novel adsorbent, nitric acid was used to create more —OH groups on the surface of OMC. Then, the nitric acid-modified OMC was dosed with phosphoric acid to create a phosphorylation reaction between phosphoric acid and —OH groups.

The synthetic carbons activation was performed with phosphoric acid(I) and phosphoric acid(III). First, OMC is added to nitric acid with continuous stirring at a set temperature. In one embodiment, 2 grams of OMC are added to 1M nitric acid and continuously stirred at room temperature. However, other suitable ratios of OMC to nitric acid may be used. In one or more embodiments, the mixture is stirred for 1 to 3 hours. In one embodiment, the mixture is stirred for 2 hours.

A reflux condenser as known in the art is the applied to contain the mixture at 140° C. for 4 hours. Other methods of maintaining constant temperature may be used. In one or more embodiments, the mixture is maintained at a temperature between 120 and 160° C. for 2 to 5 hours.

And then, the mixture is washed with DI water and placed in the oven to be dried at 80° C. overnight. In one or more embodiments, the drying temperature may be between 70 and 100° C. and the drying time may be between 8 and 14 hours. The resulting mixture after the drying is nitric acid modified OMC ("MOMC-N").

Next, phosphoric acid is added to the MOMC-N and stirred continuously. In one embodiment 65 mL of 85% phosphoric acid was added and the mixture was stirred at room temperature for 2 hours. However, other volumes and ratios of phosphoric acid may be used as suitable. In one or more embodiments, the mixture is stirred for 1 to 3 hours. In one embodiment, the mixture was stirred with $N_2$ purging and mixed with LiBr.

In other embodiments, other materials that perform the same function as phosphoric acid are used: for example, phosphorus oxychloride ($POCl_3$), phosphorus pentoxide ($P_2O_5$), trialkyl phosphite, and diammonium hydrogen phosphate ($(NH_4)_2HPO_4$).

In one or more embodiments, a reflux condenser is used to keep the mixture at 140° C. for 8 hours. Other methods of maintaining constant temperature may be used. In one or more embodiments, the mixture is maintained at a temperature between 100 and 200° C. for 2 to 5 hours.

Finally, the obtained product is washed with 2,000 mL of DI water and dried in the oven at 80° C. overnight. In one or more embodiments, the drying temperature may be between 70 and 100° C. and the drying time may be between 8 and 14 hours. The final novel product is nitric acid-phosphoric acid modified OMC ("MOMC-NP").

In one or more embodiments, the mixture was washed with THF, water, DMF, methylene chloride, of which water was used to hydrolyze ethoxyl groups to hydroxyl groups to generate phosphate-functionalized OMC.

Example 1

The surface functional groups of OMC and MOMC-NP were qualitatively measured by scanning from 4,000 cm$^{-1}$ to 400 cm$^{-1}$ with Jasco 4700 Fourier Transform Infrared Spectroscopy (FTIR).

The specific surface area, pore volume, average pore size and pore size distribution for SBA-15, OMC, and MOMC-NP were obtained by using a Micromeritics ASAP 2020 surface area and porosimetry analyzer. The nitrogen adsorption and desorption isotherm were measured in relative pressure (P/P$_0$) at a range of 0 to 0.99.

SEM images for OMC and MOMC-NP were obtained from a JEOL 6300 Field Emission Scanning Electron Microscopy. The acceleration voltage used was 15 kV and the samples were sputter coated with 15 nm of gold.

TEM images for SBA-15, OMC, and MOMC-NP were collected from a Hitachi 7600 Transmission Electron Microscopy. The acceleration voltage was 100 kV. The samples were prepared by dispersing a large number of particles in ethanol with an ultrasonic bath for 1 h and a drop of the resulting suspension was placed on a 400 mesh Cu grid.

The Boehm Titration is a commonly used technique to identify the acidic oxygen functional groups on the surface of carbon. Therefore, this method was cited to qualify the acidic oxygen functional groups on the surface of OMC. In this technique, $NaHCO_3$, $Na_2CO_3$, and NaOH were chosen to identify the acidic oxygen functional groups on the surface of carbon, whereby bases of various strength neutralize different acidic oxygen surface functionalities. NaOH is used to identify the carboxylic, lactonic and phenolic groups on the surface of OMC, $Na_2CO_3$ reacts with carboxyl and lactonic groups and $NaHCO_3$ only reacts with the carboxyl groups. HCl was used to quantify the amount of the basic functionalities presenting on the surface of OMC.

Three groups of 10 mg of OMC, MOMC-N, and MOMC-NP were placed into three 100 ml flasks and 25 ml of a 0.0500 M solution of each basic reagent was added into each flask. Then, the mixture was vigorously agitated for 24 h at room temperature. Next, the samples were filtered using 0.45 μm filter papers. Five (5) mL of the aliquots of the filtrate were transferred to a 50 ml beaker using pipettes. Finally, three aliquots of 5 ml were back-titrated with 0.0500 M of HCl. The formula used to express the number of surface functional groups($n_{csf}$) is:

$$n_{csf} = [B]V_B = [HCl]V_{HCl}\frac{V_B}{V_A} \qquad (1)$$

Where: $n_{csf}$ is the number of moles of surface functional groups on the OMC surface, [B] (mol L$^{-1}$) is the concentration of the reaction base mixed with OMC, MOMC-N, and MOMC-NP, $V_B$ (L) is the volume of the reaction base mixed with OMC, MOMC-N, and MOMC-NP, [HCl] (mol L$^{-1}$) is the concentration of the acid used to titrate the base, $V_{HCl}$ (L) is the volume of the acid used to titrate the base, $V_A$ (L) is the volume of aliquots taken from $V_B$.

The adsorption experiments were carried out in batch mode. The parameters for adsorption studies including pH value, initial concentration, temperature, and contact time were assessed during the experiment. The Pb(II) solutions with the initial desired concentrations were placed in 40 ml glass vials and the glass vials were capped and sealed with parafilm. One blank sample without absorbents (OMC, MOMC-N, and MOMC-NP) was prepared and treated with the regular samples under 250 rpm in the shaker under ambient temperature conditions. This blank sample was considered as a reference control in every batch. Initial concentrations have significant effects on the performance of Pb(II) removal. In this study, 60 mg L$^{-1}$, 80 mg L$^{-1}$, and 100 mg L$^{-1}$ Pb(II) solutions were used for Pb(II) kinetic studies. Pb(II) solution's properties also have a direct influence on the adsorption studies such as temperature and pH value. The pH value of sample solution adjusted by 0.1 M $HNO_3$ and 0.1M NaOH from 2 to 10 and temperature varied from 25° C. to 45° C. were investigated to analyze the effects on lead ion removal. The samples were placed in the shaker and agitated at 250 rpm for 3 hours. After shaking, the vials were removed and solutions were filtered by a 0.45 μm syringe filter.

The adsorption capacity of OMC, MOMC-N, and MOMC-NP q (mg g$^{-1}$) at equilibrium condition was calculated by the following equation:

$$Q_e = \frac{(C_i - C_e) \times V}{M} \qquad (2)$$

Where, $C_i$ is the initial concentration of absorbate, $C_e$ is the final concentration of adsorbate at equilibrium (mg L$^{-1}$), V is the volume of the solution (L) and M is the mass of the absorbent (g).

However, the adsorption capacity at pre-determined time intervals was calculated by using the following equation:

$$Q_t = \frac{(C_i - C_t) \times V}{M} \quad (3)$$

Where, $C_t$ is the concentration of adsorbate (mg L$^{-1}$) at time t (min).

The Pb(II) concentration was measured by Atomic Absorption Spectrometer (PerkinElmer PinAAcle 900T) as reported by Tran et al. The pH value of the sample solutions was determined by a pH meter (Accumet Dual Channel pH/Ion/Conductivity Meter XL 50).

Figure 2:
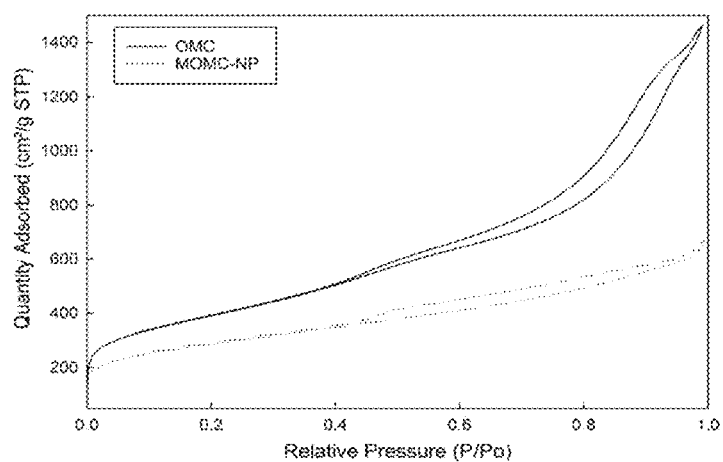
FIG. 2 is a graph of a Nitrogen adsorption-desorption isotherm of OMC and MOMC-NP.
Figure 3:
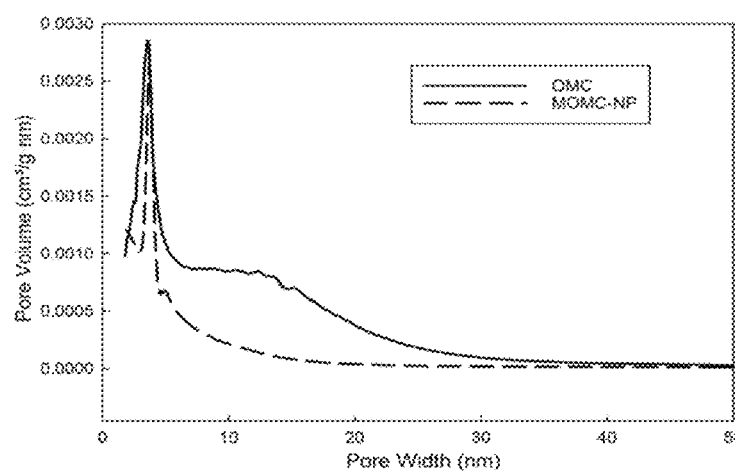
FIG. 3 is a graph of a Pore size distribution of OMC and MOMC-NP.

The surface area and pore size distribution of SBA-15, OMC, and MOMC-NP are shown in FIG. 1, FIG. 2, and FIG. 3. The SBA-15 has a surface area of 1286.37 m$^2$ g$^{-1}$ and pore size of 4.6 nm shown in Table 1. The OMC possessed higher surface area (1361.08 m$^2$ g$^{-1}$) and pore size (4.8 nm) compared with MOMC-NP shown in Table 1. The probable reason is that the structure of mesoporous channels of OMC shrinks after treatment of phosphoric acid. Therefore, the surface area and pore size of MOMC-NP decreased. FIG. 2 shows type IV isotherm was applicable as revealed by nitrogen adsorption/desorption isotherm on OMC and MOMC-NP, which is typically observed for mesoporous materials. A smaller relative pressure range of capillary condensation step in MOMC-NP in FIG. 2 indicated a narrow pore size distribution for MOMC-NP. On the other hand, a larger relative pressure range of capillary condensation step revealed a wider pore size distribution for OMC. This could also be observed in FIG. 3 showing the pore size of OMC is wider than the pore size of MOMC-NP. Majority of the pore size falls within the range of mesopore (2-50 nm), indicating that this material is mesoporous material and the data in Table 1 also prove this conclusion.

TABLE 1

Surface area and pore size of OMC and MOMC-NP

| Materials | BET Surface Area (m$^2$ g$^{-1}$) | Pore size (nm) |
| --- | --- | --- |
| SBA-15 | 1286.37 | 4.6 |
| OMC | 1361.08 | 4.8 |
| MOMC-NP | 994.65 | 3.9 |

Figure 4:
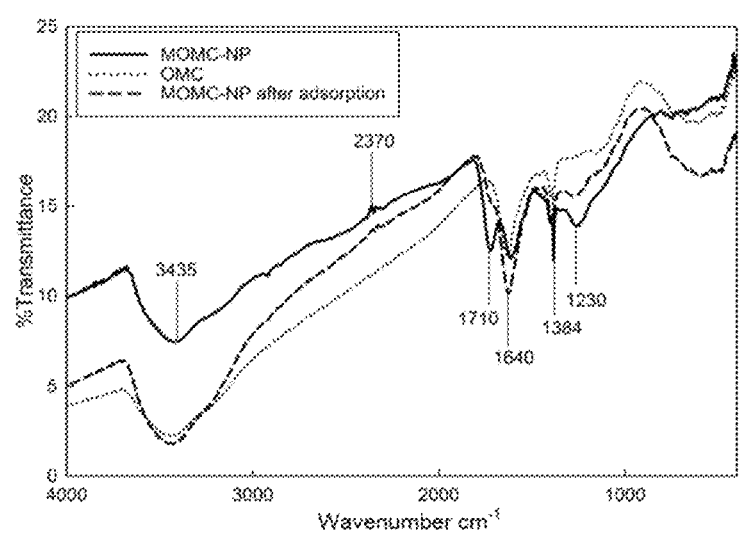
FIG. 4 is a graph of a FTIR spectra of OMC, MOMC-NP, MOMC-NP after Pb(II) adsorption.

The FT-IR spectra of OMC, MOMC-NP, and MOMC-NP after lead ion adsorption are shown in FIG. 4. As observed, several peaks ascribed to —OH groups, C—O groups, and alkenes bend were aroused at 3435 cm$^{-1}$, 2370 cm$^{-1}$, 1384 cm$^{-1}$ and 1640 cm$^{-1}$ in all of these three samples. The peaks observed at 1710 cm$^{-1}$ was ascribed to C=O groups in MOMC-NP and the peak at 1230 cm$^{-1}$ is attributed to the stretching vibrations of hydrogen-bonded P=O, stretching vibrations of O—C in P—O—C linkage, and P=OOH. The disappearance of the peak at 1710 cm$^{-1}$ and the reduction of the peak at 1230 cm$^{-1}$ can be observed significantly in MOMC-NP after Pb(II) adsorption when compared to the MOMC-NP. The shifts occurred after Pb(II) adsorption possibly suggesting that the metal binding process was taking place on the active sites of MOMC-NP during the adsorption process. Accordingly, it can be further indicated that the chemical adsorption as opposite to physical adsorption is the major process in the adsorption process since the significant difference in the FTIR spectrum of MOMC-NP after Pb(II) adsorption compared with the FTIR spectrum of MOMC-NP.

Figure 5A:
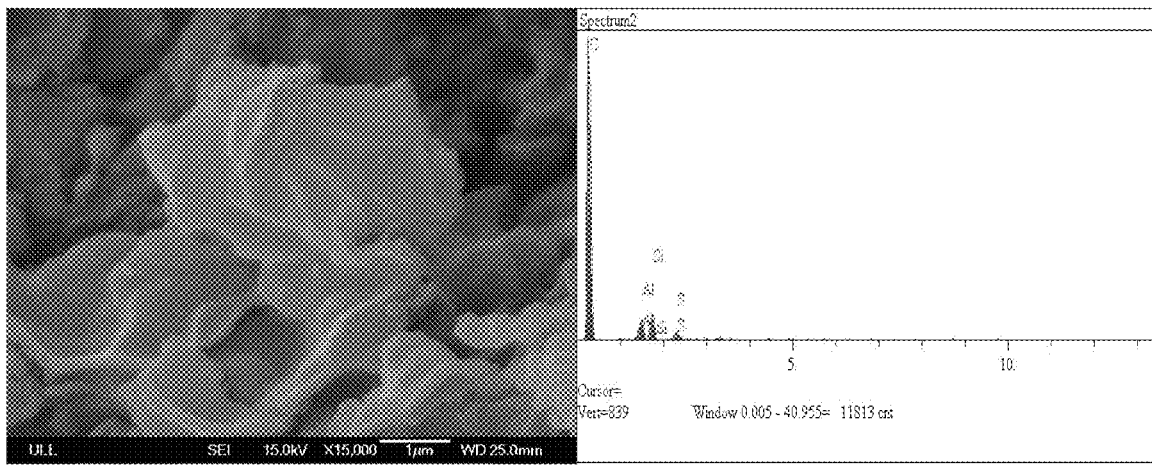
FIG. 5($a$) is a depiction of SEM and EDS images of OMC.
Figure 5B:
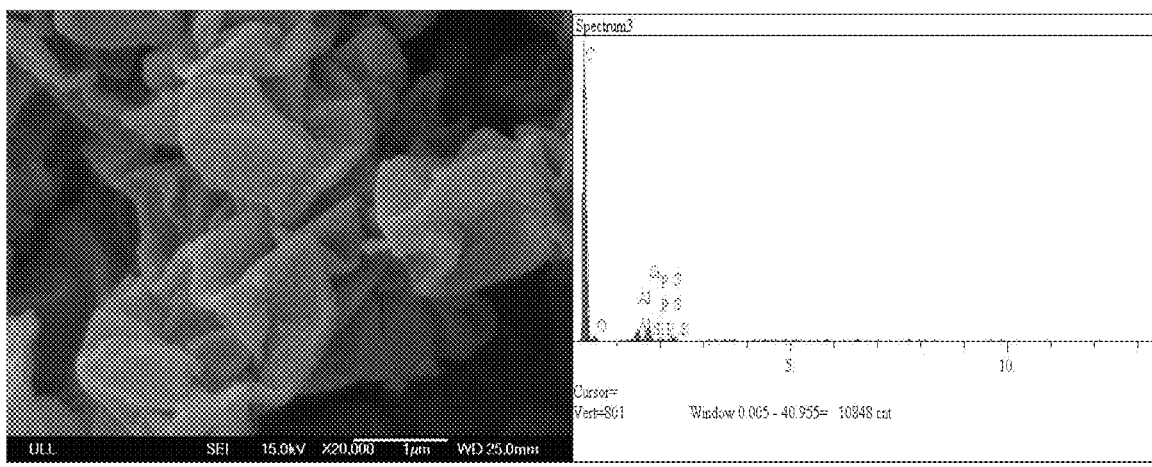
Figure 5C:
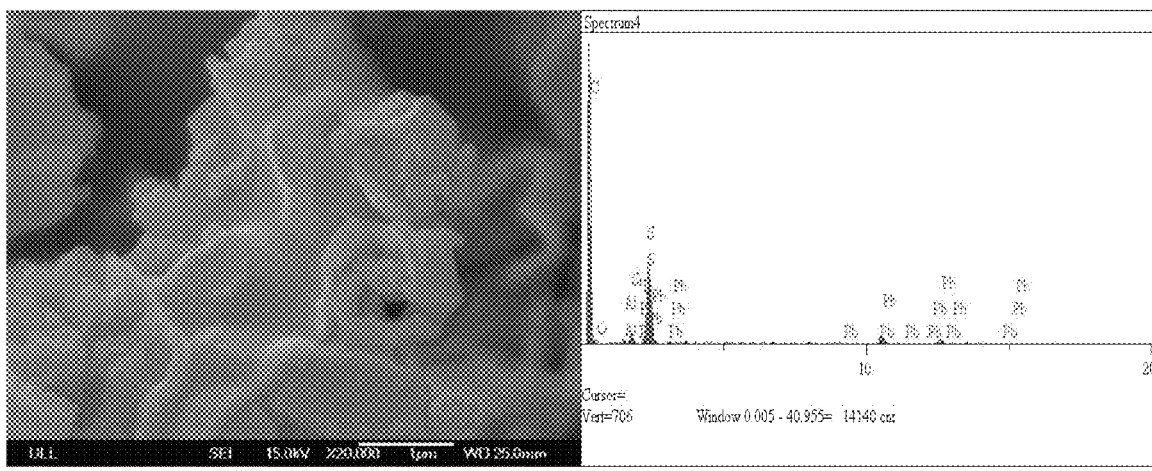

Scanning electron microscope is an extremely useful method to observe the changes in the morphology of the materials and the EDS is also useful to identify the elements on the materials' surfaces. The SEM-EDS micrographs of OMC, MOMC-NP, and MOMC-NP after Pb(II) adsorption are shown in FIG. 5. The morphology of original OMC shows smooth and the EDS indicated that carbon is the main element for OMC and the presence of sulfur, possibly due to the sulfuric acid being introduced as catalysts in the progress of making original OMC. After chemical modification, the surface morphology of MOMC-NP is drastically changed whereby the surface had more irregular form and more angles, the EDS spectrum confirmed the presence of phosphorus on the MOMC-NP. The change observed after Pb(II) adsorption on the surface of MOMC-NP is smoother than both of morphology of OMC and MOMC-NP, which is due to the Pb(II) complexation formed with the activated sites on the surface of MOMC-NP, and EDS micrograph certified the existence of lead on the MOMC-NP.

Figure 6A:
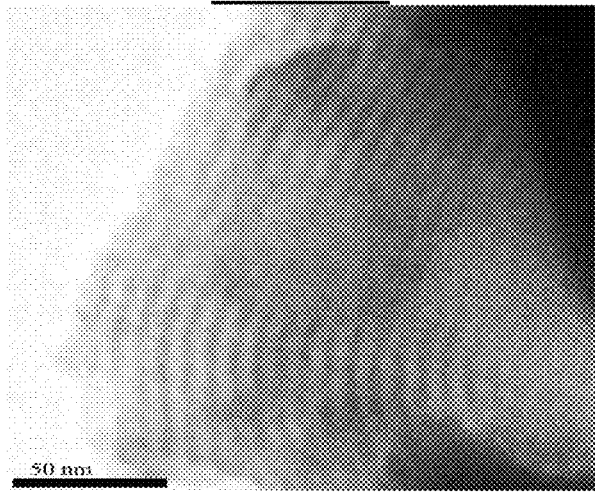
FIG. 6($a$) is TEM images of SBA-15 template.
Figure 6B:
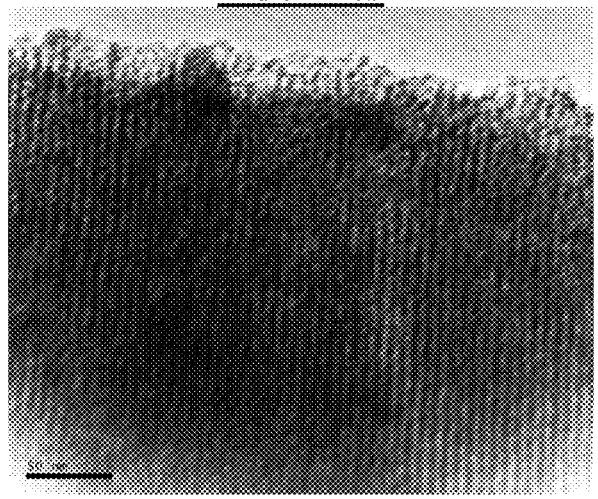
Figure 6C:
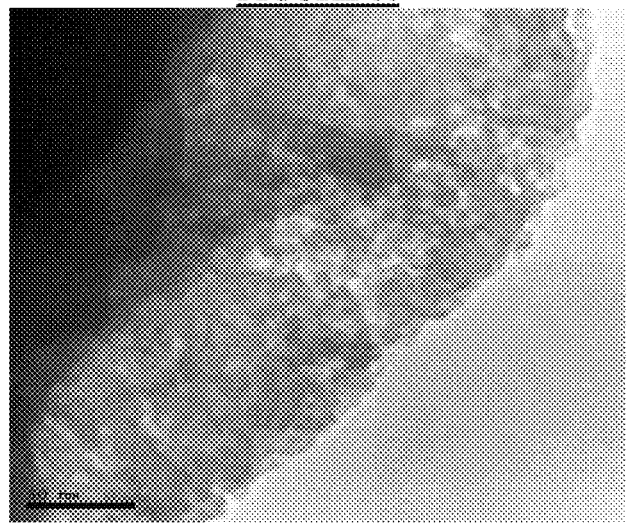

The TEM images of SBA-15 template, OMC and MOMC-NP are shown in FIG. 6. The TEM image of SBA-15 shows the uniformly arranged pores that corresponded to the p6 mm structure typically observed. The TEM images of OMC show the ordered structures and the TEM image of MOMC-NP indicates that the ordered structure disappeared after chemical treatment. The reason is probably that the treatment of the acids shrank the ordered structure of OMC, which also explains the lower surface area and pore size after modified modification.

The Boehm titration results of OMC, MOMC-N, and MOMC-NP are shown in Table 2. The carboxylic groups were found to be increased from 0.59 mmol g$^{-1}$ for OMC to 0.73 mmol g$^{-1}$ and 0.97 mmol g$^{-1}$ for MOMC-N and MOMC-NP, respectively. The lactonic groups and phenolic groups were found to be consistently increasing from 0.022 to 0.033 mmol g$^{-1}$ and 0.056 to 0.084 mmol g$^{-1}$, respectively. The adsorption capacity of these three adsorbents for lead ions increased with the increase of the acidic sites. This could be attributed to the release of H$^+$ from the acidic sites and the exchange of Pb$^{2+}$ with H$^+$ at the vacant acidic sites.

TABLE 2

Boehm titration results of OMC, MOMC-N, and MOMC-NP

| | Carboxylic (mmol g$^{-1}$) | Lactonic (mmol g$^{-1}$) | Phenolic (mmol g$^{-1}$) | Total acidic group (mmol g$^{-1}$) | Total basic group (mmol g$^{-1}$) |
| --- | --- | --- | --- | --- | --- |
| OMC | 0.59 | 0.022 | 0.056 | 0.668 | 0.13 |
| MOMC-N | 0.73 | 0.029 | 0.073 | 0.832 | 0.96 |
| MOMC-NP | 0.97 | 0.033 | 0.084 | 1.087 | 1.26 |

Figure 7A:
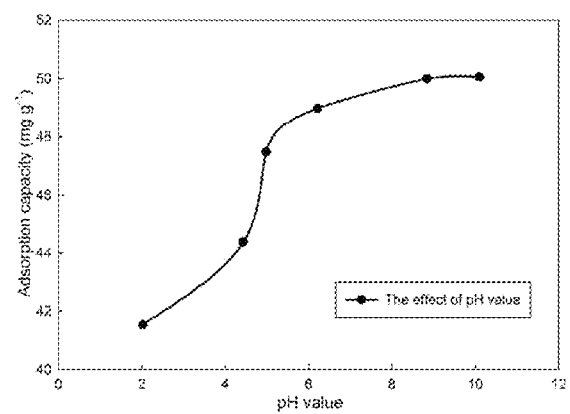
FIG. 7($a$) is the graphs of The effect of pH value on Pb(II) removal after adsorption by MOMC-NP.
Figure 7B:
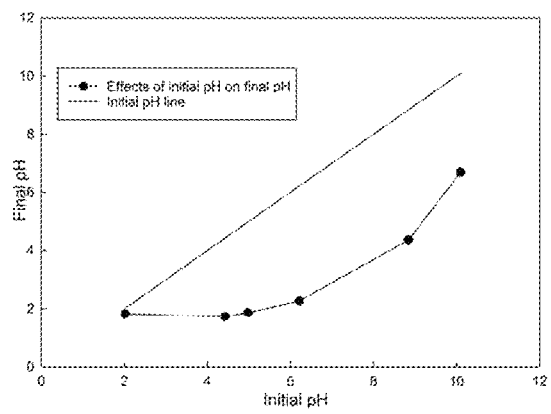

Adsorption of Pb(II) on the MOMC-NP was studied at various pH values. The results are shown in FIG. 7(*a*). From the plot, the adsorption capacity is going up with the increase of pH value of the solution. The adsorption capacity of Pb(II) increased from 41.54 mg g$^{-1}$ to 50 mg g$^{-1}$ with a change in pH from 2.0 to 10.0. However, the precipitation was observed obviously in the Pb(II) solution since the pH value of the solution reached to 5.5, which means that the amount of lead ion removal includes the amount of Pb(II) adsorbed by MOMC-NP and precipitation when the pH value is higher than 5.5 in the solution. Therefore, the adsorption capacity was observed at an optimum pH of around 5. Below this pH, a decreasing trend in adsorption capacity was observed. And above this pH, precipitation was observed in the aqueous solution. Researchers also reported that the formation of insoluble hydrolyzed species Pb(OH)$_2$ occurred at pH of 6. The pH value of the initial Pb(II) solution, one of the most significant parameters, can affect the adsorption capacity by influencing the surface charge of the adsorbents. And, it also can result in the dissociation of the functional groups on the surface of MOMC-NP. At low pH, the MOMC-NP's surface was highly protonated. Therefore, the formation of bonding was interrupted due to repulsive forces occurred between the Pb(II) and active site. At a higher pH, the carbon surface was negatively charged. Lower electrostatic repulsion forces between Pb(II) and the carbon surface promotes a higher adsorption capacity. The pH value after adsorption as a function of pH value before adsorption was plotted in this FIG. 7(b). A significant change observed is that the pH value decreased after Pb(II) adsorption. Based on the analysis above, the ion exchange mechanism could be preferentially considered as the key adsorption mechanism.

The major functional groups on the surface of MOMC-NP are —OH groups, carboxyl groups, and phosphate groups as proved by the FTIR spectrum obtained. These functional groups possess the capability of capturing Pb(II). At a lower pH, the H$^+$ ions compete with Pb(II)cations for the exchange sites on the MOMC-NP. At a higher pH, there may be an amount of species presenting in solution such as Pb$^{2+}$, Pb(OH)$^+$, and Pb(OH)$_2$. Therefore, with an increase of pH, the lead(II) ion species may be absorbed by a hydrogen bonding mechanism along with ion exchange. These mechanisms are shown in the following equations:

Ion Exchange:

$$2(R-OH)+Pb^{2+} \rightarrow (R-O)_2Pb+2H^+ \text{ or } 2(R-POH)+Pb^{2+} \rightarrow (R-PO)_2Pb+2H^+ \quad (4)$$

$$R\text{-}POH+Pb(OH)^+ \rightarrow R\text{—}POPb(OH)+H^+ \text{ or } R\text{-}OH+Pb(OH)^+ \rightarrow R\text{—}OPb(OH)+H^+ \quad (5)$$

Hydrogen Bonding:

$$2R\text{-}OH+Pb(OH)_2 \rightarrow (R\text{—}OH)_2Pb(OH)_2 \text{ or } 2R\text{-}POH+Pb(OH)_2 \rightarrow (R\text{—}POH)_2Pb(OH)_2 \quad (6)$$

Where, R is the matrix of the MOMC-NP.

Overall, an increase in pH up to the point of 5 shows an increase in adsorption. Precipitation can be observed in the solution with the pH of 5.5. Therefore, a pH=5 was considered as the optimum pH value for the further experiments.

Figure 8:
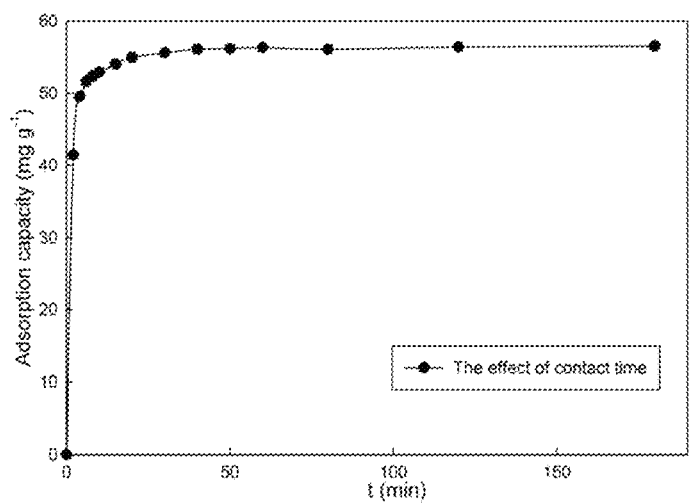
FIG. 8 is a graph of adsorption kinetics of Pb(II) on MOMC-NP ($C_0$=60 mg $L^{-1}$, S/V=1 g $L^{-1}$, T=25° C., Shaking time=3 h, pH=5).

The adsorption of lead(II) ion onto MOMC-NP as a function of contact time was studied at an initial concentration of 60 mg L$^{-1}$ as shown in FIG. 8. The equilibrium was achieved around 25 mins with the adsorption capacity of MOMC-NP at equilibrium is 56.45 mg g$^{-1}$. Compared to the previous kinetic studies with activated carbon for lead(II) ion removal indicated an equilibrium contact time of 40 mins, the equilibrium contact time for the MOMC-NP is shorter. The reason is possibly that all of the functional groups were grafted on the external surface of OMC and the adsorption process was rapidly contributing to the external surface adsorption. Overall, after 25 mins, the adsorption capacity was fairly constant so that it could be considered as the equilibrium time for Pb(II)adsorption. According to the above analysis, the sufficient contact time of 180 mins was used as the carrying out time for the further adsorption experiments. Table 3 indicates the adsorption capacity of OMC, MOMC-N (only treated by Nitric acid) and MOMC-NP for lead ions at 60 mg L$^{-1}$ of Pb(II). Compared to MOMC-NP with the adsorption capacity of 56.45 mg g$^{-1}$, the adsorption capacity of OMC and MOMC-N are 1.43 mg g$^{-1}$ and 38.2 mg g$^{-1}$, respectively, suggesting a less contribution to the Pb(II) removal. Compared with the removal efficiency of OMC for Pb(II), the removal efficiency of MOMC-N increased from 1.6% to 62.2%. Similarly, the removal efficiency of MOMC-NP increased up to 92.6%. The reason for these increases is that more functional groups were grafted onto the surface of OMC after phosphoric acid treatment. Therefore, MOMC-NP was regarded as the primary adsorbent to be studied in the further experiments.

Figure 9:
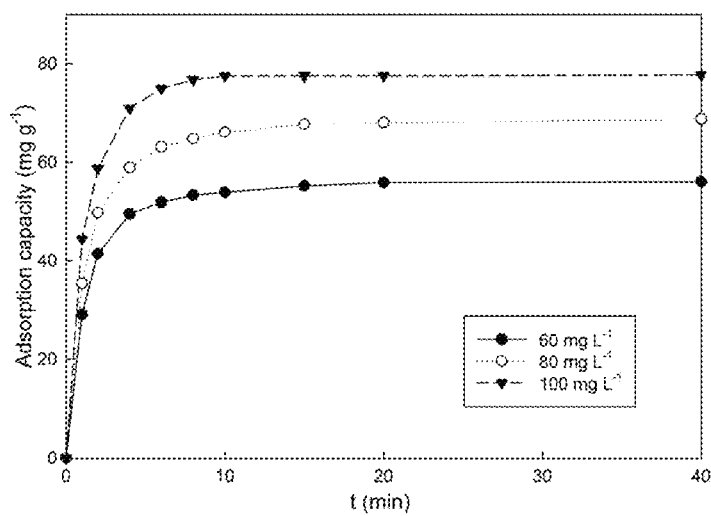
FIG. 9 is a graph of adsorption of lead on MOMC-NP at $C_0$=60 mg $L^{-1}$, 80 mg $L^{-1}$, and 100 mg $L^{-1}$, respectively (T=25° C., S/V=1 g $L^{-1}$, pH=5).

The effects of contact time and initial concentration on the adsorption of lead onto the MOMC-NP was studied as shown in FIG. 9. The adsorption capacity of Pb(II)$^+$ increases with an increase of shaking time and reaches the equilibrium around 25 mins during the adsorption process for 60 mg L$^{-1}$, 80 mg L$^{-1}$, and 100 mg L$^{-1}$ of Pb(II). The corresponding equilibrium adsorption capacity was 56.06 mg g$^{-1}$, 68.82 mg g$^{-1}$, and 77.8 mg g$^{-1}$. The initial Pb(II) concentration has a strong effect on the adsorption capacity of the absorbent. From FIG. 9, the adsorption capacity of MOMC-NP for Pb(II) removal significantly increased from 56.06 mg g$^{-1}$ to 77.8 mg g$^{-1}$ when the initial concentration increased from 60 mg L$^{-1}$ to 100 mg L$^{-1}$. This observation could be attributed to that higher Pb(II) concentration has the stronger driving force to combine with the active sites presenting on the surface of MOMC-NP. A similar result has been reported that the acceleration of adsorption capacity increased due to the stronger driving force by adsorbate.

The straight-lines of Pseudo-First-order model, Pseudo-Second-order model, Elovich model, and Weber Morris intra-particle diffusion model at three different initial Pb(II) concentrations were plotted in FIG. 10. The correlation coefficient (R$^2$) of four models and the parameters of four models at three different Pb(II) concentrations are summarized in Table 4.

System adsorption kinetics is an excellent approach to predict and study the adsorption rate for designing and modelling adsorption processes. Some of the adsorption rate steps include diffusion control, chemical reactions, and particle diffusion. Two different kinetics models that have been reported to be used to assess experimental data are Pseudo-First-Order model, and the Pseudo-Second-Order model. The linearized Pseudo-First-Order kinetics model is expressed as:

$$\ln(Q_e - Q_t) = \ln Q_e - \frac{K1}{2.303} \cdot t \quad (7)$$

Where, k$_1$ (min$^{-1}$) is the Pseudo-First-Order rate constant for adsorption, Q$_e$ and Q$_t$ are the amount of Pb(II) adsorbed (mg g$^{-1}$) on MOMC-NP at time t (min) and at equilibrium, respectively. Linear plots of ln(Q$_e$-Q$_t$) vs. t are presented as FIG. 10a. The k$_1$ values calculated from the slopes of the plots for the different initial concentrations are shown in Table 4.

Pseudo-Second-Order model was determined with the assumption used that the rate of occupation sites is proportional to the square of the number of unoccupied sites. The linearized Pseudo-Second-Order kinetics model is expressed as:

$$\frac{t}{Q_t} = \frac{1}{k_2 Q_e^2} + \frac{t}{Q_e} \tag{8}$$

Where, $k_2$ is the equilibrium rate constant of Pseudo-Second-Order model (g mg$^{-1}$ min$^{-1}$). The linear plots of $t/Q_t$ vs t are presented in FIG. 10b. The parameters shown in Table 4 were determined from the intercept and slope of the plots of $t/Q_t$ vs t.

The values of $R^2$ of Pseudo-Second-Order model for all three initial Pb(II) concentrations were above 0.99. Similarly, the value of $R^2$ of Pseudo-First-Order model for all three initial Pb(II) concentrations were 0.87, 0.95, and 0.99, respectively, which indicates good agreement with the experimental data. Based on the $R^2$ values obtained from various models studied in this research, the best fitted adsorption kinetics models were in order of prediction precision: Pseudo-Second-order>Pseudo-First-order>Elovich>Weber Morris intra-particle diffusion, indicating that Pseudo-Second-Order model provides the best fit to experimental data over the other models. Pseudo-Second-Order model is based on the assumption of adsorption by the second order chemisorption. Therefore, Pseudo-Second-Order model suggested that the type of the adsorption is chemical adsorption.

Comparing the values of $Q_e$ with both models at the three different initial Pb(II) concentrations, the Pseudo-First-Order model provided $Q_e$ of 23.53 mg g$^{-1}$, 34.99 mg g$^{-1}$, and 56.06 mg g$^{-1}$ at the three different initial Pb(II) concentrations, respectively. Similarly, the value of $Q_e$ of Pseudo-Second-Order Model at three different initial Pb(II) concentrations were 57.80 mg g$^{-1}$, 71.43 mg g$^{-1}$, and 84.75 mg g$^{-1}$, respectively, which is closer to the experimental results. This further confirmed that the Pseudo-Second-Order model showed a better fit to the adsorption kinetics than Pseudo-First-Order Model. The constant rate ($K_1$) in Pseudo-First-Order model increases with the increase of the initial Pb(II) concentration and the constant rate ($K_2$) in Pseudo-Second-Order model decreases with the increase of the initial Pb(II) concentration.

The Elovich Equation is given as follows:

$$\frac{dQ_t}{d_t} = \alpha e^{-\beta Q_t} \tag{9}$$

The integration of the rate equation with the same boundary conditions as the Pseudo First- and Second-Order equations becomes the Elovich Equation which is shown below:

$$Q_t = \beta \ln(\alpha\beta) + \beta \ln(t) \tag{10}$$

Where, $\alpha$ is the initial sorption rate (mg g$^{-1}$ min$^{-1}$), and the parameter $\beta$ is related to the extent of surface coverage and activation energy for chemisorption (g mg$^{-1}$). The $\beta$ and $\alpha$ values calculated from the slope and inteçept of the plots, repectively.

Figure 10A:
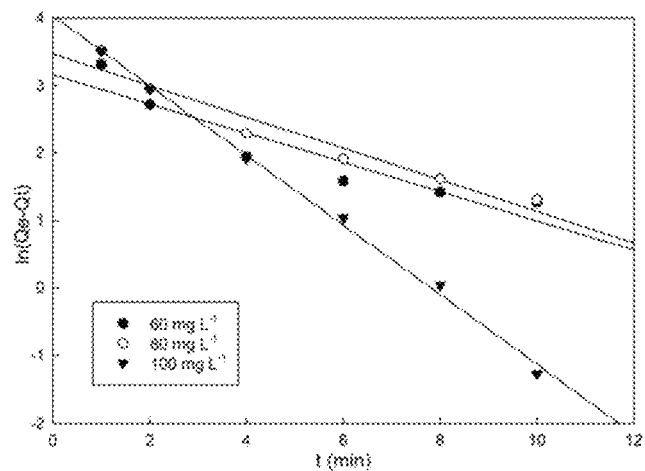
FIG. 10($a$) is the graph of adsorption kinetics models Pseudo-First-Order model, FIG. 10($b$) is the graph of adsorption kinetics models Pseudo-Second-Order model, FIG. 10($c$) is the graph of adsorption kinetics models Elovich model, FIG. 10($d$) is the graph of adsorption kinetics models Weber Morris intra-particle diffusion model (T=25° C., S/V=1 g $L^{-1}$, pH=5).
Figure 10B:
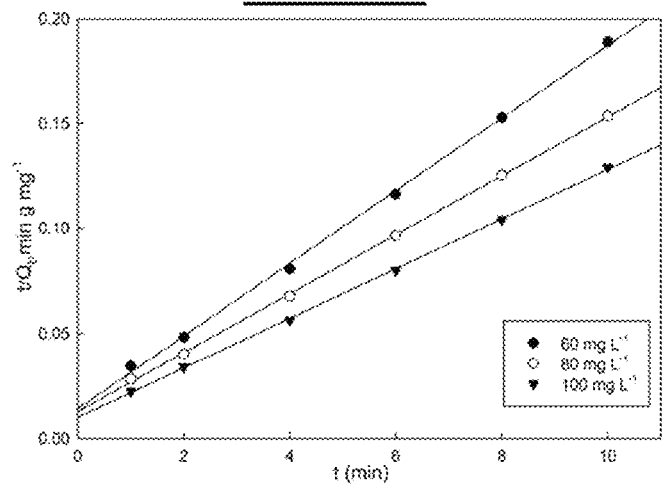
Figure 10C:
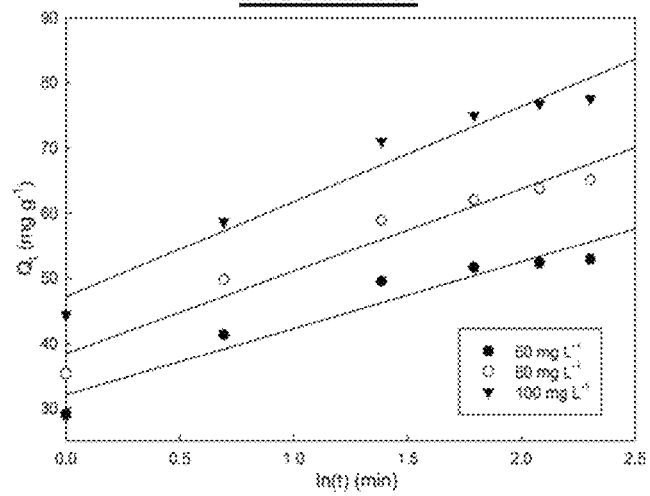

The Elovich kinetics model was evaluated by plotting $Q_t$ versus ln(t) as shown in FIG. 10(c). The correlation coefficient values obtained at three initial concentrations were 0.92, 0.95, and 0.96. The $\beta$ values of Elovich model at three initial Pb(II) concentrations increases with the increase of initial Pb(II) concentration. The $\alpha$ values of Elovich model at three initial Pb(II) concentrations are pretty low (2.26, 1.65, and 1.75), indicating that the Elovich model is not suitable to describe the sorption mechanism accurately. However, the Elovich model explains that the heterogeneous Pb(II) adsorption process occurred on the surface of the MOMC-NP.

The Weber-Morris intra-particle diffusion model is used to gain insight into mechanisms and rate controlling steps affecting adsorption kinetics. The intercept of the plot depicts the boundary layer effect. The higher values of intercept indicate the greater contribution of the surface sorption in the rate controlling step and if the plot is linear and passes through origin, then the intraparticle diffusion is the sole rate limiting step. The Weber-Morris intra-particle diffusion model is given as follows:

$$Q_t = K_1 t^{1/2} + C \tag{11}$$

$$K_1 = 6\frac{C}{R}\sqrt{\frac{D}{\pi}} \tag{12}$$

Where, $Q_t$ is the amount adsorbed at any time t (mg g$^{-1}$), $K_1$ is the intra-particle diffusion rate constant (mg g$^{-1}$ min$^{-1/2}$), C is the intercept depicting boundary layer effect, D is the intra-particle diffusion coefficient, and R is the radius of the particle.

Figure 10D:
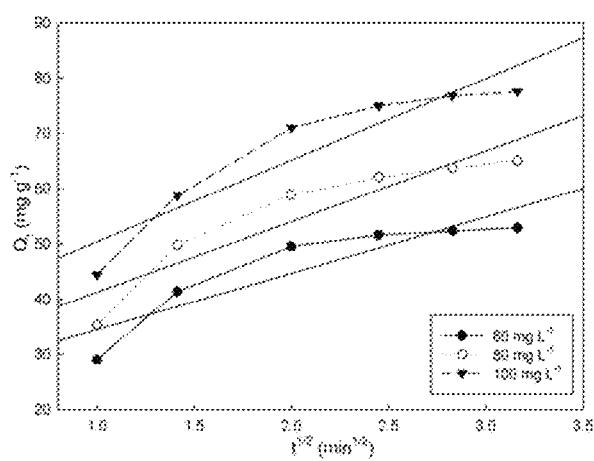

The Weber Morris intra-particle diffusion model shown in FIG. 10(d) was also tested to provide more insight into the mechanisms and rate controlling steps affecting the adsorption kinetics. The straight lines at the three initial concentrations were plotted as $Q_t$ vs $t^{1/2}$ and the parameters calculated and summarized in Table 4. If the plot of the model is linear and goes through the origin, then the adsorption of Pb(II) onto the MOMC-NP would be controlled by intra-particle diffusion. However, as shown in FIG. 10(d), none of the three lines pass through the origin indicating that the adsorption of Pb(II) onto MOMC-NP is a complex process involving surface adsorption, inter-particle diffusion, and intra-particle diffusion. As shown in FIG. 10(d), similar trend was observed where the adsorption capacity gradually increases and then flattens as the process reached equilibrium for three initial concentrations. This indicates that the faster mass transfer through the boundary layer on the surface of MOMC-NP occurred at the beginning and then the adsorption was controlled by slower diffusion of adsorbate into the inside of MOMC-NP particles. The deviation from the origin may be due to the difference in the rate of diffusion in the initial and final stages of adsorption processes as discussed by Qiu et al. The $K_1$ and C values increase with the increase of the initial Pb(II) concentration. The diffusion coefficients at three initial concentrations obtained from the plots are $3.63 \times 10^{-7}$ cm$^2$/s, $4.11 \times 10^{-7}$ cm$^2$/s, and $3.51 \times 10^{-7}$ cm$^2$/s.

TABLE 4

Summary of Pseudo-First-Order and Pseudo-Second-Order constants for lead adsorption at different concentration

| Models | Parameters | 60 mg L$^{-1}$ | 80 mg L$^{-1}$ | 100 mg L$^{-1}$ |
|---|---|---|---|---|
| | Experimental $Q_e$ (mg g$^{-1}$) | 56.06 | 68.82 | 77.8 |
| Pseudo-First-order | $K_1$ (min$^{-1}$) | 0.50 | 0.60 | 1.19 |
| | $Q_e$ (mg g$^{-1}$) | 23.53 | 34.99 | 56.06 |
| | $R^2$ | 0.87 | 0.95 | 0.99 |
| Pseudo-Second-order | $K_2$ (g mg$^{-1}$ min$^{-1}$) | 0.021 | 0.015 | 0.014 |
| | $Q_e$ (mg g$^{-1}$) | 57.80 | 71.43 | 84.75 |
| | $R^2$ | 0.99 | 0.99 | 0.99 |
| Elovich | $\alpha$ (mg g$^{-1}$ min$^{-1}$) | 2.26 | 1.65 | 1.75 |
| | $\beta$ (g mg$^{-1}$) | 10.22 | 12.65 | 14.58 |
| | $R^2$ | 0.92 | 0.95 | 0.96 |
| Weber Morris intra-particle diffusion | $K_1$ (mg g$^{-1}$ min$^{-1/2}$) | 10.22 | 12.77 | 14.76 |
| | C (mg g$^{-1}$) | 24.26 | 28.48 | 35.61 |
| | $R^2$ | 0.82 | 0.86 | 0.87 |
| | D (cm$^2$s$^{-1}$) | 3.63 × 10$^{-7}$ | 4.11 × 10$^{-7}$ | 3.51 × 10$^{-7}$ |

Figure 11:
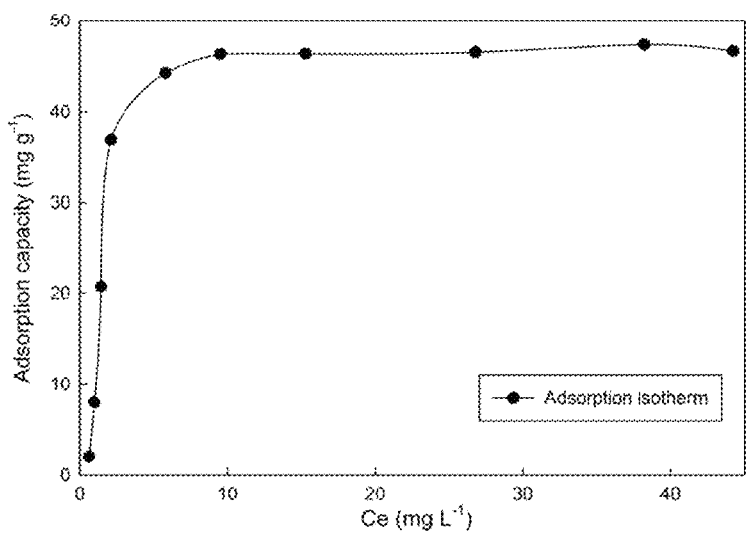
FIG. 11 is a graph of adsorption isotherm of MOMC-NP ($C_0$=50 mg $L^{-1}$, V=40 ml, T=25° C., Shaking time=3 h, pH=5).

The adsorption trends of the Pb(II) on the MOMC-NP with an initial Pb(II) concentration of 50 mg L$^{-1}$ are plotted as functions of the equilibrium concentration of Pb(II) and are shown in FIG. 11. From the results, the adsorption capacity was increasing up to the maximum adsorption capacity of 46.96 mg g$^{-1}$. The adsorption capacity was going up rapidly with the decrease of the amount of the MOMC-NP. When the amount of MOMC-NP is 40 mg, the adsorption capacity of MOMC-NP started to meet the optimum level. Therefore, 40 mg was regarded as the common amount of the adsorbent in the further adsorption experiment.

Nine different isotherm models were used to analyze the adsorption processes onto the MOMC-NP, which are the Langmuir, Freundlich, Dubinin-Radushkevich, Temkin, Halsey, Harkins-Jura, Elovich, Redlich-Peterson, and Sips isotherm models.

The Langmuir model is based on the assumption that the maximum adsorption corresponds to a saturated monolayer of adsorbate molecules onto homogeneous sites on the adsorbent with a constant energy and no interaction between adsorbed species. The linear form is expressed as follows:

$$\frac{C_e}{Q_e} = \frac{1}{Q_{max} \cdot K_L} + \frac{C_e}{Q_{max}} \quad (13)$$

Where, $Q_e$ (mg g$^{-1}$) is the adsorption capacity of MOMC-NP at equilibrium, $C_e$ (mg L$^{-1}$) is the concentration of Pb(II) solution at equilibrium, $Q_{max}$ (mg g$^{-1}$) is the maximum monolayer adsorption capacity of MOMC-NP, $K_L$ (L mg$^{-1}$) is the Langmuir adsorption constant.

The important characteristic of the Langmuir isotherm is indicated by the dimensionless separation factor, $R_L$, which is expressed as the following formula:

$$R_L = \frac{1}{1 + K_L \cdot C_i} \quad (14)$$

Where, $R_L$ is dimensionless separation factor, $C_i$ is the initial concentration of the Pb(II) solution.

The $R_L$ value suggests that the possibility of the adsorption process being favorable (0<$R_L$<1), unfavorable ($R_L$>1), linear ($R_L$=1), or irreversible ($R_L$=0).

FIG. 12(a)-(i) shows the Langmuir, Freundlich, Dubinin-Radushkevich (D-R), Temkin, Halsey, Harkins-Jura, Elovich, Redlich-Peterson and Sips adsorption isotherm, respectively. The data of nine isotherm modeling were tabulated in Table 5. In the graph of Langmuir isotherm modeling, the $R^2$ is 0.99, which indicates that the Langmuir isotherm equation best fit the experimental data. $Q_{max}$ represents the maximum adsorption capacity which is 47.89 mg g$^{-1}$ and it is close to the experimental result of 46.96 mg g$^{-1}$. The dimensionless separation factor ($R_L$) is used to evaluate an essential feature of the Langmuir isotherm, for the test system, $R_L$=0.0116<1 for MOMC-NP, indicating that the adsorption of Pb(II) was a favorable process.

The Freundlich model is an empirical equation assuming heterogeneous adsorptive energies on the adsorbent surface, which can be written as:

$$\ln Q_e = \frac{1}{n} \ln C_e + \ln K_f \quad (15)$$

Where, $K_f$ (mg g$^{-1}$) is the Freundlich adsorption isotherm constant. The term 1/n indicates that the heterogeneity of the data distribution of energetic centers and is related to the magnitude of the adsorption driving force.

Freundlich model gives the parameters, n, indicative of bond energies between metal ions and the adsorbent and $K_f$, related to bond strength. The $R^2$ of the Freundlich equation is equal to 0.69 which indicated it doesn't fit reasonably well with the experimental data. Significantly, Langmuir model provides a great better fit than the Freundlich model. Freundlich model is characterized by 1/n heterogeneity factor; hence, it is applicable for sorption on heterogeneous surfaces. Smaller value of 1/n implies stronger interaction between the adsorbent and heavy metal, while 1/n values exist between 0 and 1 indicating the identical adsorption process and adsorption energies for all sites. These results are similar to the ones described by Lalhmunsiama et al.

The Dubinin-Radushkevich (D-R) model provides further knowledge and understanding of adsorption processes by determinating the main type of the adsorption mechanism (physical or chemical). The linearized D-R model is:

$$\ln Q_e = \ln Q_m - \beta \varepsilon^2 \quad (16)$$

Where: $Q_m$ (mg g$^{-1}$) is the theoretical adsorption capacity, $\beta$ (mol$^2$J$^{-2}$) is a constant related to the mean energy of adsorption, ε(J·mol$^{-1}$) is the Polanyi potential that is related to the equilibrium concentration as follows:

$$\varepsilon = RT \ln\left(1 + \frac{1}{C_e}\right) \tag{17}$$

R and T are the gas constant (8.314 J mol$^{-1}$ K$^{-1}$) and absolute temperature (K), respectively.

The Adsorption Free Energy, E (KJ mol$^{-1}$) indicates that one mole of ion is transferred onto the surface of the adsorbent from the solution. The equation is shown as follows:

$$E = \frac{1}{\sqrt{2\beta}} \tag{18}$$

Where, E provides information about adsorption mechanism. E<8 kJ mol$^{-1}$ indicates physical adsorption is dominating while 8 kJ mol$^{-1}$<E<16 kJ mol$^{-1}$ and E>16 kJ mol$^{-1}$ suggested ion exchange and chemisorption, respectively.

The R$^2$ of Dubinin-Radushkevich (D-R) model is equal to 0.90, which indicates that this model has a good fit to experimental data. $Q_{max}$ in the Dubinin-Radushkevich (D-R) model is equal to 47.00 mg g$^{-1}$ which is closed to the experimental result. The mean free energy of adsorption, E, obtained from the D-R Model was less than 8 kJ mol$^{-1}$. This value suggests that the adsorption is physical in nature.

The Temkin Isotherm Model assumes that the heat of the adsorption for all molecules in the layer would decrease linearly rather than logarithmic with coverage. The model is expressed by the following formula:

$$Q_e = \frac{RT}{b_T} \ln(A_T) + \frac{RT}{b_T} \ln(C_e) \tag{19}$$

$$B = \frac{RT}{b_T} \tag{20}$$

$$Q_e = B \ln(A_T) + B \ln(C_e) \tag{21}$$

Where, $A_T$ (L g$^{-1}$) is the Temkin isotherm equilibrium constant, $b_T$ is the Temkin isotherm constant.

The Temkin model is used to describe adsorbate and adsorbent interactions based on the assumption that the heat of adsorption of all the molecules in the layer decreases linearly instead of logarithmically and adsorption is characterized by a uniform distribution of binding energies across the surface. The high value of $b_T$ (2290 J mol$^{-1}$) is less than 80 kJ/mol suggesting a physical adsorption nature in the adsorption process. However, the R$^2$ value of 0.69 suggests that the Temkin model has not good fit with the experimental values. This indicates that the Temkin model cannot describe the adsorption process accurately. Therefore, based on the Temkin model analysis, the adsorption could be physical adsorption, chemical adsorption or physical and chemical adsorption.

Halsey isotherm model is used to evaluate the multilayer adsorption system for metal ions adsorption at a relatively large distance from the surface. The Halsey isotherm model is pressed as follows:

$$\ln(Q_e) = \left[\left(\frac{1}{n_H}\right)\ln(K_H)\right] - \frac{1}{nH}\ln\frac{1}{C_e} \tag{22}$$

Where, $K_H$ and $n_H$ are Halsey constants.

Harking-Jura isotherm model describes the multilayer adsorption and the existence of the heterogeneous pore distribution in the surface of adsorbents. The equation is shown as follows:

$$\frac{1}{Q_e^2} = \frac{B_{HJ}}{A_{HJ}} - \frac{1}{A_{HJ}}\log(C_e) \tag{23}$$

Where, $A_{HJ}$ and $B_{HJ}$ are the Harking-Jura constants.

Elovich model implies a multilayer adsorption based on the assumption that the adsorption sites increase exponentially with adsorption. The Elovich model is described as follows:

$$\frac{Q_e}{Q_m} = K_E C_e e^{\frac{Q_e}{Q_m}} \tag{24}$$

$$\ln\left(\frac{Q_e}{C_e}\right) = \ln(K_E Q_m) + \frac{Q_e}{Q_m} \tag{25}$$

Where, $K_E$ is the Elovich equilibrium constant (L mg$^{-1}$), and $Q_m$ is the monolayer adsorption capacity (mg g$^{-1}$).

Figure 12A:
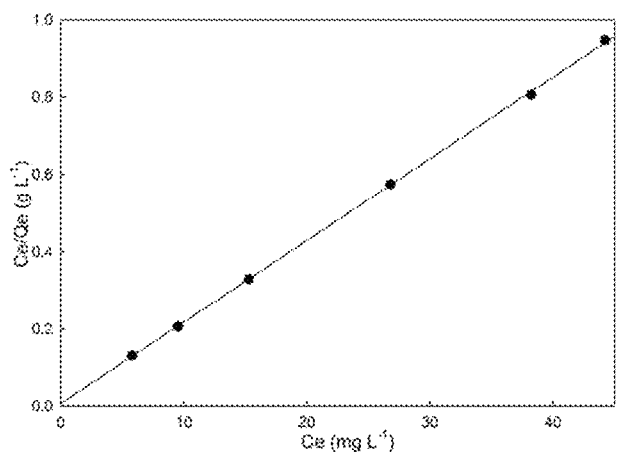
FIG. 12$a$ is the graph of Langmuir isotherm.
Figure 12B:
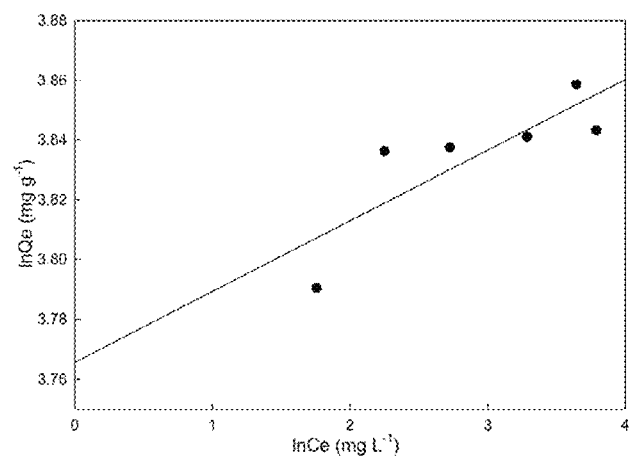
Figure 12C:
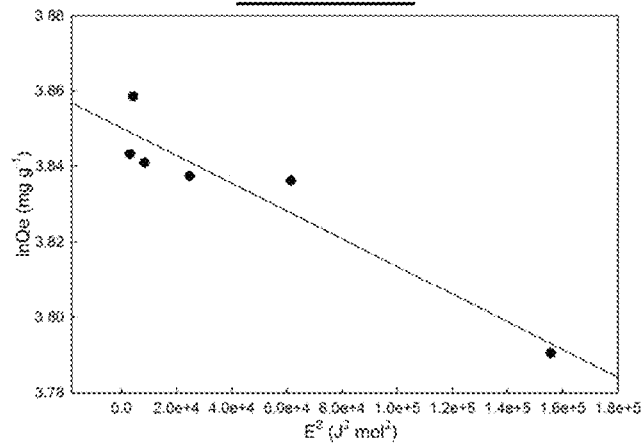
Figure 12D:
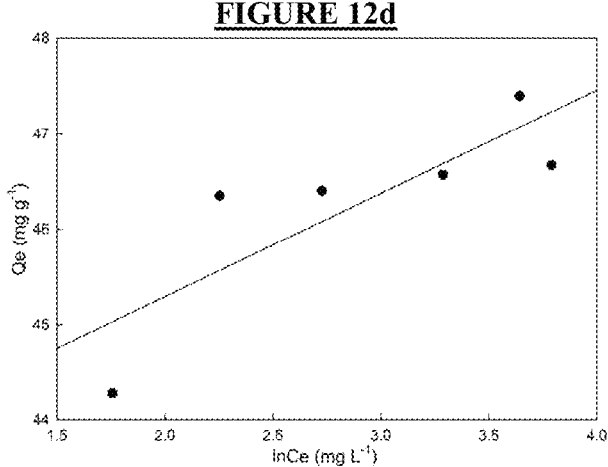
Figure 12E:
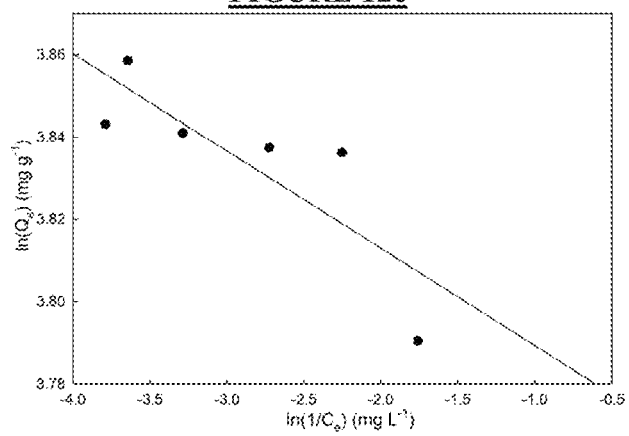
Figure 12F:
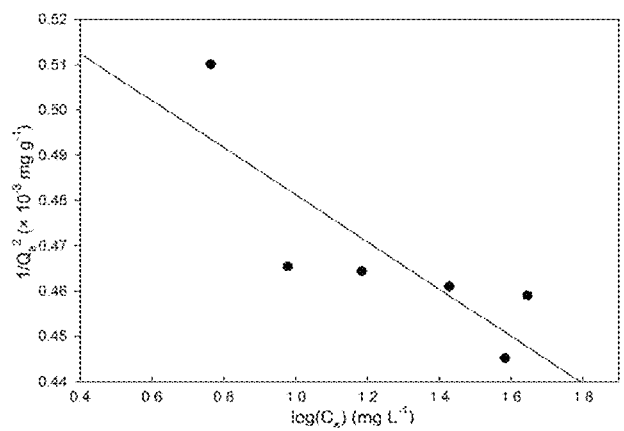
Figure 12G:
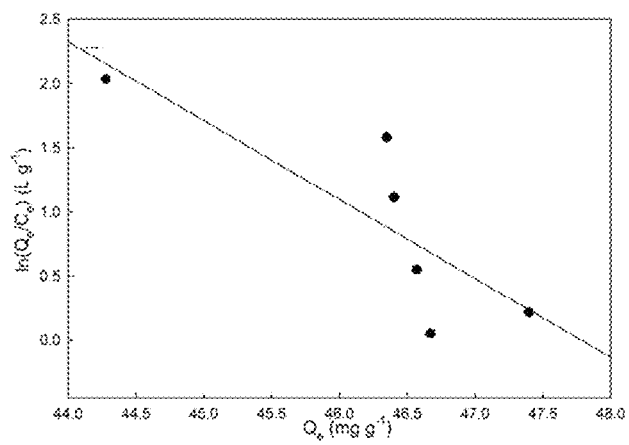
Figure 12H:
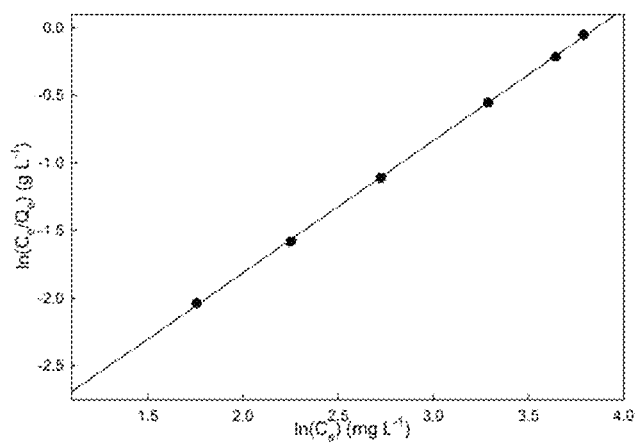
Figure 12I:
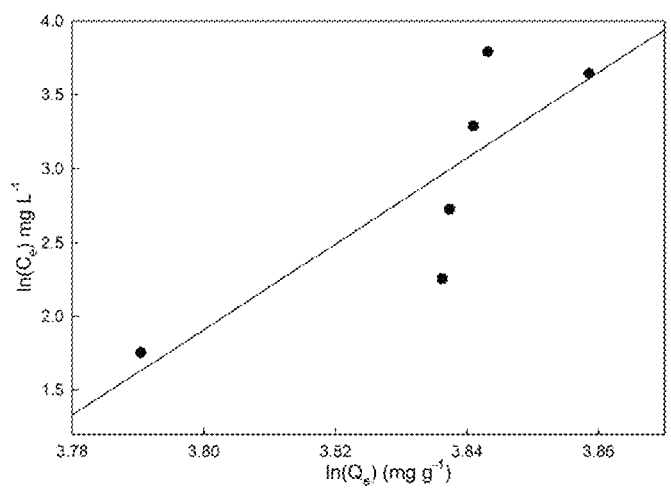

The Halsey isotherm model plot with a correlation coefficient of 0.69 for Pb(II) adsorption is shown in FIG. 12(e). This suggests that the Halsey isotherm model does not fit to the experimental data well. Therefore, this model reveals that the multilayer adsorption is not the dominant adsorption, but the heteroporous nature of the adsorbent, heterogeneous distribution active sites, and multilayer adsorption of Pb(II) still present lightly onto MOMC-NP. The R$^2$ of 0.68 obtained from Harkins-Jura isotherm model indicating that the model does not have a good fit with the experimental data. It also reveals that the multilayer adsorption is not the main adsorption during the adsorption process but there is still the existence of the heterogeneous pore distribution in the surface of MOMC-NP. Similarly, the Elovich isotherm model does not have a good fit to the experimental data with a R$^2$ of 0.67 and it suggests that the multilayer adsorption is not the main adsorption in adsorption process.

Redlich Peterson model is described as follows:

$$Q_e = \frac{K_{RP} C_e}{1 + \alpha_R C_e^\beta} \tag{26}$$

Where, $K_{RP}$ and β are the Redlich Peterson model constants. When the value of β is equal to 1, the above equation is reduced to Langmuir isotherm, while it reduced to a Freundlich isotherm, in case the value of the parameter $\alpha_R C_e^\beta$ is much bigger than 1 The ratio of $$\frac{K_{RP}}{\alpha_R}$$

indicates the adsorption capacity.

Sips model is a non-linear Freundlich-Langmuir isotherm shown in following:

$$Q_e = \frac{Q_s K_s C_e^{nS}}{1 + K_s C_e^{nS}} \quad (27)$$

Where, $K_s$ is equilibrium constant. If the value of nS is equal to 1 then this equation will become a Langmuir equation. Alternatively, as either $C_e$ or $K_s$ approaches 0, this isotherm reduces to the Freundlich isotherm.

The Redlich-Peterson isotherm model exhibited good fit to the experimental data with a $R^2$ of 0.99. The value of β is 0.93, which is very close to 1, indicates that this model is probably equal to Langmuir isotherm model according to the theory reported by Belhachemi et al. The monolayer adsorption capacity, $K_{RP}/\alpha_P$ (36.60 mg g$^{-1}$) calculated from the Redlich-Peterson isotherm model is close to the adsorption capacity of Langmuir isotherm model. The deviation of the β from the Langmuir model (β=1) which in turn explains the deviation from the Langmuir monolayer adsorption capacity of 47.39 mg g$^{-1}$. The Sips isotherm model with a $R^2$ of 0.69 shows a fair fit to the experimental data indicating that the Pb(II) could be adsorbed onto heterogeneous surfaces of MOMC-NP.

Overall, based on the value of $R^2$ obtained from all nine isotherm models studied in this work, the best fitted adsorption isotherm model is Langmuir isotherm model. All adsorption isotherms were in order of prediction precision: Langmuir>Redlich-Peterson>Dubinin-Radushkevich (D-R)>Freundlich>Temkin>Halsey>Sips>Harkins-Jura>Elovich. The $R^2$ values of the good fit models are 0.99, 0.99, 0.90 and the $R^2$ values of the fair fit models are 0.69, 0.69, 0.69, 0.69, 0.68, and 0.67.

TABLE 5

Summary of adsorption isotherm constant for Pb$^{2+}$ adsorption on the MOMC-NP

| Adsorption isotherm model | Parameter | |
|---|---|---|
| Langmuir | $Q_{max}$ (mg g$^{-1}$) | 47.39 |
| | $K_L$ (L mg$^{-1}$) | 2.48 |
| | $R_L$ | 0.008 |
| | $R^2$ | 0.99 |
| Freundlich | $K_f$ [(mg g$^{-1}$)(L mg$^{-1}$)$^{1/n}$] | 43.19 |
| | 1/n | 0.0236 |
| | $R^2$ | 0.69 |
| Dubinin-Radushkevich (D-R) | $Q_m$ (mg g$^{-1}$) | 47.00 |
| | β(mol$^2$J$^{-2}$) | 4 × 10$^{-7}$ |
| | E(kJ mol$^{-1}$) | 1.12 |
| | $R^2$ | 0.90 |
| Temkin | B(J mol$^{-1}$) | 1.0818 |
| | $b_T$ (J mol$^{-1}$) | 2.29 × 10$^3$ |
| | $A_T$ (L g$^{-1}$) | 2 × 10$^{17}$ |
| | $R^2$ | 0.69 |
| Halsey | $n_H$ | 42.37 |
| | $K_H$ | 1.98 × 10$^{69}$ |
| | $R^2$ | 0.69 |

TABLE 5-continued

Summary of adsorption isotherm constant for Pb$^{2+}$ adsorption on the MOMC-NP

| Adsorption isotherm model | Parameter | |
|---|---|---|
| Harkins-Jura | $A_{HJ}$ | 29.68 |
| | $B_{HJ}$ | 0.0148 |
| | $R^2$ | 0.68 |
| Elovich | $Q_m$ | 1.63 |
| | $K_E$ | 3.52 × 10$^{12}$ |
| | $R^2$ | 0.67 |
| Redlich-Peterson | β | 0.93 |
| | A | 36.60 |
| | $R^2$ | 0.999 |
| Sips | $K_s$ | 0.03 |
| | $n_S$ | 8.71 × 10$^{-48}$ |
| | $R^2$ | 0.69 |

The comparison of the maximum adsorption capacity of Pb(II) on various adsorbents employed in the literature is listed in Table 6. Based on the different materials used as adsorbents, the adsorption capacities of Pb(II) are different, mostly due to the different structure and chemical compositions. As shown in Table 6, the adsorption capacity of Pb(II) on modified ordered mesoporous carbons (MOMC-NP) is 77.8 mg g$^{-1}$ at the initial concentration of 100 mg L$^{-1}$ which is higher than the other reported capacities. Therefore, the great performance makes it become effectively potential adsorbents for Pb(II) removal from aqueous solutions.

TABLE 6

Comparison of the maximum adsorption capacity of Pb$^{2+}$ on various adsorbents reported in the literature

| Adsorbents | Initial Pb$^{2+}$ concentrations (mg L$^{-1}$) | $Q_0$ (mg g$^{-1}$) |
|---|---|---|
| Modified ordered mesoporous carbons (MOMC-NP) | 100 | 77.8 |
| Activated carbon (pine cone) | 100 | 27.53 |
| Turkish kaolinite clay | 400 | 31.75 |
| Meranti sawdust | 200 | 34.24 |
| Activated carbon (Tamarind wood) | 50 | 43.86 |
| Keratin powder (Algerian Sheep Hoofs) | >100 | 46.51 |
| Palm kernel fibre | 120 | 40.20 |
| Bacteria modified activated carbon (Sorbo-Norit) | 200 | 54.10 |
| Modified peat-resin particles | 500 | 47.39 |
| Hydroxyapatite granular activated carbon nanocomposite (C-HAp) | 400 | 9-14 |
| Granular bentonite composite | 100 | 4.6 |
| Fe$_3$O$_4$ MNPs | 120 | 36 |
| Modified granular activated carbon (GAC) | 80 | 35 |
| Algal waste | 300 | 44 |
| Commercial activated carbon (CAC) | >100 | 54.65 |

Three thermodynamics characters, Gibbs Free Energy of Adsorption (ΔG°), the Enthalpy change (ΔH°), and the Entropy change (ΔS°) were studied to explore the thermodynamic process mechanism. These three thermodynamics characters are useful to explain the effects of the different temperatures on the performance for Pb$^{2+}$ removal from aqueous solution. The formula used to calculate the Gibbs Free Energy of Adsorption (ΔG°) is shown below:

$$\Delta G° = -RT \ln K \quad (28)$$

Where, ΔG° (J mol$^{-1}$) is the free energy change, R (8.314 J mol$^{-1}$ k$^{-1}$) is the universal constant, T (K) is the absolute temperature, and K is thermodynamic equilibrium constant. K is defined by the following equation:

$$K = \frac{Q_e}{C_e} \quad (29)$$

Where: $Q_e$ (mg g$^{-1}$) is the adsorption capacity of MOMCs at equilibrium, $C_e$ (mg L$^{-1}$) is the concentration of Pb(II) solution at equilibrium. The equation expressing the relations between ΔG°, ΔH°, and ΔS°:

$$\Delta G° = \Delta H° - T\Delta S° \quad (30)$$

Considering both of equation (28) and equation (30), we can get the following equation:

$$\ln K = \frac{\Delta S°}{R} - \frac{\Delta H°}{RT} \quad (31)$$

Figure 13:
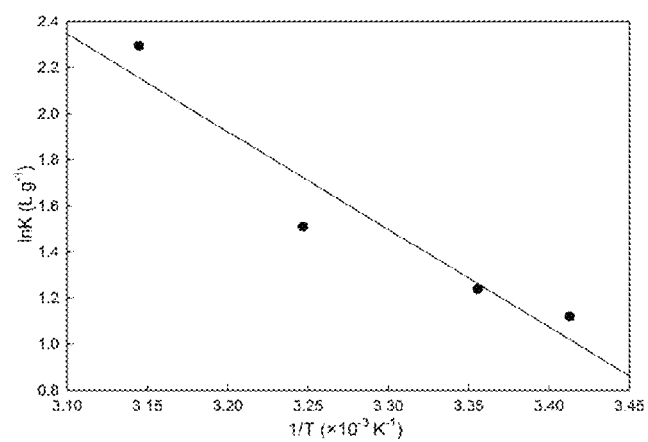
FIG. 13 is a graph of Van't Hoff plot for the adsorption of lead on MOMC-NP.
Figure 14:
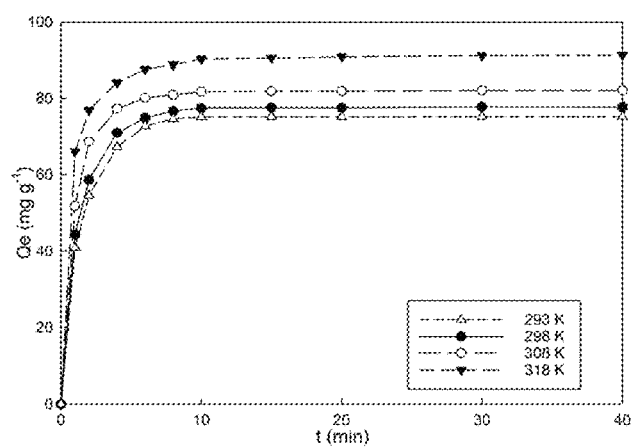
FIG. 14 is a graph of adsorption capacity of MOMC-NP at 293 K, 298 K, 308 K, and 318 K, respectively ($C_0$=100 mg $L^{-1}$, S/V=1 g $L^{-1}$, pH=5).

The ΔH° value and ΔS° value can be calculated by the slope and intercept of the linear plot of ln K vs. 1/T shown in FIG. 13. The $R^2$ of the plot is 0.92 indicating a good fit to the experiment data. The thermodynamic parameters for adsorption of Pb(II) on MOMC-NP are shown in Table 7. The negative values of ΔG° indicate spontaneous adsorption of lead onto the surface of MOMC-NP. The positive value of ΔH° further confirmed the endothermic adsorption of lead. The positive ΔS° was characteristic of increased randomness at the solid-solution interface during the adsorption of lead onto MOMC-NP. According to Crini and Badot (2008), a more negative value of ΔG° at higher temperatures, as was observed in this study, implied greater driving force for adsorption at high temperature. The results of the adsorption kinetics study at different temperatures depicted in FIG. 14 indicate that temperature had a significant influence on the adsorption capacity of MOMC-NP for Pb(II). The equilibrium adsorption capacity increases with an increase of temperature. The equilibrium adsorption capacities are 75.29 mg g$^{-1}$, 77.80 mg g$^{-1}$, 82.09 mg g$^{-1}$, and 91.27 mg g$^{-1}$ at 293 K, 298 K, 308 K, and 318 K, respectively. The result also certifies the conclusion which is an increase in driving force during the adsorption process with an increase of temperature.

TABLE 7

Thermodynamic parameters for adsorption of Pb$^{2+}$ on MOMC-NP

| Metal | T (K) | Langmuir isotherm | | | | |
|---|---|---|---|---|---|---|
| | | $Q_e$ (mg g$^{-1}$) | $Q_e/C_e$ (L mg$^{-1}$) | ΔG° (kJ mol$^{-1}$) | ΔH° (kJ mol$^{-1}$) | ΔS° (J mol$^{-1}$) |
| Pb$^{2+}$ | 293 | 75.29 | 3.06 | −2.48 | 35.23 | 128.71 |
| | 298 | 77.80 | 3.45 | −3.13 | | |
| | 308 | 82.09 | 4.54 | −4.41 | | |
| | 318 | 91.27 | 9.90 | −5.70 | | |

Figure 15:
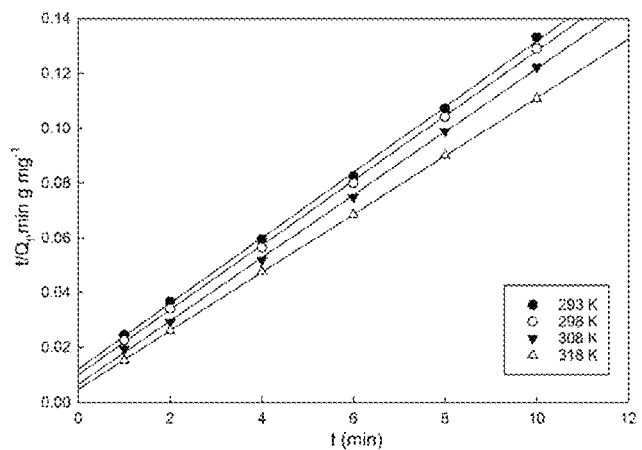
FIG. 15 is a graph of Pseudo-Second-Order at different temperature for the adsorption of lead on MOMC-NP ($C_0$=100 mg $L^{-1}$, S/V=1 g $L^{-1}$, pH=5).

Pseudo-Second-Order model was plotted at four different temperatures with the same $R^2$ values of 0.99 as shown in FIG. 15. The plots indicate that the Pseudo-Second-Order fits very well to the experiment data. The parameters were calculated and shown in Table 8. The $K_2$ values increase with the increase of the temperture. This confirms that the driving force increases during the adsorption process with the increase of temperature. The experimental $Q_e$ is closer to the $Q_e$ value calculated from Pseudo-Second-Order model at higher temperature. This observation could be explained that MOMC-NP has a better performance on Pb(II) removal at high temperature due to the endothermic adsorption process.

TABLE 8

The parameters of Pseudo-Second-Order model at four different temperatures

| Parameters | 293 K | 298 K | 308 K | 318 K |
|---|---|---|---|---|
| $K_2$ (g mg$^{-1}$ min$^{-1}$) | 0.012 | 0.014 | 0.020 | 0.024 |
| $Q_e$ (mg g$^{-1}$) | 83.30 | 84.75 | 86.96 | 94.34 |
| Experimental $Q_e$ (mg g$^{-1}$) | 75.29 | 77.80 | 82.09 | 91.27 |
| $R^2$ | 0.99 | 0.99 | 0.99 | 0.99 |

The activation energy is a parameter to describe the minimum energy required to drive the lead adsorption processes. The activation energy for lead adsorption was calculated by the Arrhenius equation:

$$\ln k = \ln A - \frac{Ea}{RT} \quad (32)$$

Where, $k_2$ (g mg$^{-1}$ min$^-$) is the Pseudo-Second-Order rate constant for adsorption, Ea is activation energy in kJ mol$^{-1}$, T is temperature, and R is the gas constant.

Figure 16:
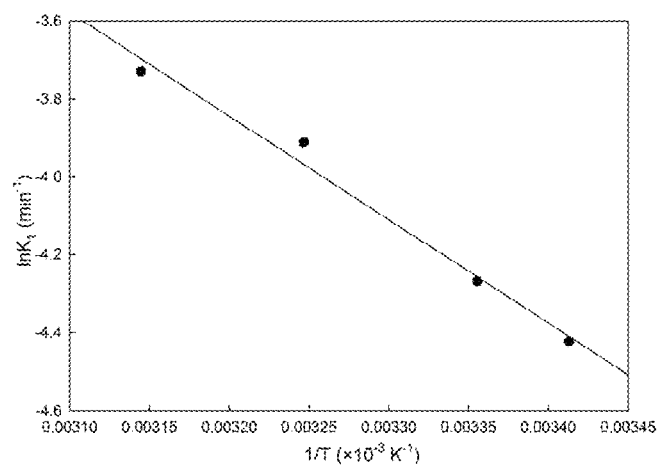
FIG. 16 is a graph of Arrhenius plot for the adsorption of lead on MOMC-NP.

Based on the $K_2$ values shown in Table 8 at four different temperatures, the Arrhenius plot was depicted with a $R^2$ of 0.98 in FIG. 16. The activation energy for lead adsorption at different temperature was calculated from the slope of the plot of ln $k_2$ vs 1/T (FIG. 16) and was found to be 22.09 kJ mol$^{-1}$. The type of the adsorption can be categorized by the magnitude of activation energy. Physical adsorption involving weak forces of attraction and reversible in nature does not require more than 4.2 kJ mol$^{-1}$ of activation energy. Specificity and involvement of strong forces are the characteristic of chemical adsorption and requires more than 4.2 kJ mol$^{-1}$ of activation energy. The activation energy for the adsorption of Pb(II) onto MOMC-NP, 22.09 kJ mol$^{-1}$, is higher than 4.2 kJ mol$^{-1}$ indicating the type of the adsorption process is chemical adsorption.

From FTIR analysis and the effects of the pH, it is clear to conclude that phosphate functional groups were grafted on the surface of MOMC-NP after modification treatment and the Pb(II) was adsorbed onto MOMC-NP via ion exchange reactions. The similar conclusions have been reported by Ornek et al and Momcilovic et al. The Pseudo-Second-Order model illuminated that the type of the adsorption is second order chemisorption. The activation energy calculated by Arrhenius equation was 22.09 kJ mol$^{-1}$, which is higher than 4.2 kJ mol$^{-1}$, confirming that the type of the adsorption is chemical adsorption. This has been reported by Manirethan et al. The Dubinin-Radushkevich (D-R) isotherm model suggested that the physical adsorption exists in the adsorption process. Therefore, it could be summarized that the chemical adsorption is the main adsorption but the physical adsorption occurred in the adsorption process. The Weber Morris intra-particle diffusion model suggested that all surface adsorption, inter-particle diffusion, and intra-particle diffusion contributed to the rate of the sorption. The similar conclusion has been reported by Dhoble et al. The Langmuir isotherm model strongly suggested that monolayer adsorption is the main adsorption but the heterogeneous adsorption still occurred in the adsorption process suggested by other isotherm models involving the Freundlich isotherm model, Harking-Jura isotherm model, Halsey isotherm model, Elovich isotherm model, and Sips isotherm model.

The OMC was synthesized via hard template method using the SBA-15 template. The MOMC-NP was successfully synthesized by the nitric acid and phosphoric acid treatments and characterized to study its application towards Pb(II) adsorption from aqueous solution. The maximum adsorption capacity of 77.80 mg g$^{-1}$ for Pb(II) adsorption onto MOMC-NP was found at the initial Pb(II) concentration of 100 mg L$^{-1}$. The Pb(II) adsorption depends on the initial Pb$^{2+}$ concentration, temperature, and pH. The adsorption capacity increased with the increase of Pb$^{2+}$ initial concentration and temperature. The optimum pH value is 5.0 for Pb(II) adsorption onto MOMC-NP. The adsorption kinetics follows Pseudo-Second-Order kinetics model. The adsorption process was endothermic in nature. The equilibrium data fitted very well to Langmuir isotherm model. The mechanism of Pb(II) adsorption was determined that chemical adsorption and monolayer adsorption are the main adsorption but physical adsorption and heterogeneous adsorption still occurred in the adsorption process.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments.

For the purpose of understanding the Method of Manufacturing an Adsorbent and Resulting Composition of Matter references are made in the text to exemplary embodiments of an Method of Manufacturing an Adsorbent and Resulting Composition of Matter, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A method for creating an adsorbent comprising the steps of:
   a. preparing a silica template;
   b. synthesizing ordered mesopours carbon by combining said silica template with sucrose, sulfuric acid, and water to form a mixture, carbonizing said mixture, then washing said mixture to remove said silica, and then filtering the resulting carbonized and washed mixture until the pH is between 6.5 and 7.5;
   c. introducing a set amount of nitric acid on to the surface of said ordered mesopours carbon to create a nitric acid carbon mixture; and
   d. dosing said nitric acid carbon mixture with a set amount of phosphoric acid to create a nitric acid-phosphoric acid modified ordered mesopours carbon.

2. The method of claim 1 wherein said set amount of nitric acid is 1M to 2 grams of ordered mosopours carbon.

3. The method of claim 1 wherein said introducing step is performed by continuously stirring at room temperature said nitric acid and said ordered mesopours carbon.

4. The method of claim 1 wherein said introducing step further comprises using a reflux condenser to contain said nitric acid carbon mixture at a temperature from 100 to 150 degrees Celsius for 2 to 5 hours.

5. The method of claim 1 wherein said introducing step further comprises washing said nitric acid carbon mixture with DI water and drying said mixture at a temperature from 70 to 100 degrees Celsius for 8 to 12 hours.

6. The method of claim 1 wherein said set amount of phosphoric acid is 65 mL of 85% phosphoric acid.

7. The method of claim 1 wherein said dosing step further comprises using a reflux condenser to contain said phosphoric acid dosed nitric acid carbon mixture at a temperature from 100 to 150 degrees Celsius for 2 to 5 hours.

8. The method of claim 1 wherein said adsorbent is effective in removing a compound from a liquid stream.

9. The composition of claim 1 wherein the adsorbent is effective in removing a compound from a gaseous stream.

10. The method of claim 1 wherein in said dosing step is performed with a phosphorylating agent other than phosphoric acid.

* * * * *